(12) United States Patent
Guo et al.

(10) Patent No.: US 11,523,400 B2
(45) Date of Patent: Dec. 6, 2022

(54) RESOURCE CONFIGURATION METHOD AND APPARATUS, AND STORAGE MEDIUM

(71) Applicant: HUAWEI TECHNOLOGIES CO., LTD., Guangdong (CN)

(72) Inventors: Zhiheng Guo, Beijing (CN); Yongqiang Fei, Beijing (CN); Zukang Shen, Beijing (CN); Yi Long, Beijing (CN); Yang Zhao, Shanghai (CN); Lei Wan, Beijing (CN); Wenping Bi, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 158 days.

(21) Appl. No.: 16/875,049

(22) Filed: May 15, 2020

(65) Prior Publication Data

US 2020/0280999 A1 Sep. 3, 2020

Related U.S. Application Data

(63) Continuation of application No. PCT/CN2018/115744, filed on Nov. 15, 2018.

(30) Foreign Application Priority Data

Nov. 17, 2017 (CN) .......................... 201711148960.2
Jan. 12, 2018 (CN) .......................... 201810031890.0

(51) Int. Cl.
*H04W 72/08* (2009.01)
*H04L 5/00* (2006.01)
(Continued)

(52) U.S. Cl.
CPC ......... *H04W 72/085* (2013.01); *H04L 5/0005* (2013.01); *H04W 28/0236* (2013.01); *H04W 72/0446* (2013.01); *H04W 72/0453* (2013.01)

(58) Field of Classification Search
CPC ........... H04W 72/085; H04W 28/0236; H04W 72/0446; H04W 72/0453; H04W 72/042;
(Continued)

(56) References Cited

U.S. PATENT DOCUMENTS 10,925,046 B2* 2/2021 Maaref ................. H04L 5/0048
2018/0049203 A1* 2/2018 Xue ....................... H04L 5/0053
(Continued)

FOREIGN PATENT DOCUMENTS

CN 107046453 A 8/2017
CN 108811139 A 11/2018
EP 3179659 A2 6/2017

OTHER PUBLICATIONS

Ericsson,"On NB-IoT, eMTC and NR coexistence",3GPP TSG RAN1#88 R1-1703115,Athens, Greece,Apr. 13-17, 2017,total 8 pages.
(Continued)

*Primary Examiner* — Pao Sinkantarakorn
*Assistant Examiner* — Kabir U Jahangir
(74) *Attorney, Agent, or Firm* — Womble Bond Dickinson (US) LLP

(57) ABSTRACT

A resource configuration method, apparatus and storage medium are disclosed. The method includes: sending, by a network device, first information to a terminal, where the first information is used by the terminal to determine not to send data and/or receive data on a first resource; and the first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource. The resource configuration method and apparatus
(Continued)

and the storage medium that are provided in the present disclosure can improve resource configuration flexibility.

18 Claims, 15 Drawing Sheets

(51) Int. Cl.
*H04W 28/02* (2009.01)
*H04W 72/04* (2009.01)

(58) Field of Classification Search
CPC .... H04W 72/082; H04L 5/0005; H04L 5/003; H04L 5/0094
See application file for complete search history.

(56) References Cited

U.S. PATENT DOCUMENTS

| | | | |
|---|---|---|---|
| 2018/0098293 A1* | 4/2018 | Jiang | H04L 7/041 |
| 2019/0013913 A1* | 1/2019 | Suzuki | H04L 5/0007 |
| 2020/0021998 A1* | 1/2020 | Baldemair | H04W 16/14 |

OTHER PUBLICATIONS

3GPP TS 36.213 V14.4 0 (Sep. 2017);3rd Generation Partnership Project;Technical Specification Group Radio Access Network;Evolved Universal Terrestrial Radio Access (E-UTRA);Physical layer procedures(Release 14);total 461 pages.
Ericsson, NR and LTE Coexistence. 3GPP TSG-RAN WG1 NR Ad Hoc #3, Nagoya, Japan, Sep. 18-21, 2017, R1-1716532, 6 pages.
Sony, NR coexistence with eMTC. 3GPP TSG RAN NR AH3, Nagoya, Japan Sep. 18-21, 2017, R1-1716252, 5 pages.

* cited by examiner

RESOURCE CONFIGURATION METHOD AND APPARATUS, AND STORAGE MEDIUM

CROSS-REFERENCE TO RELATED APPLICATIONS

This application is a continuation of International Application No. PCT/CN2018/115744, filed on Nov. 15, 2018, which claims priority to Chinese Patent Application No. 201711148960.2, filed on Nov. 17, 2017, and Chinese Patent Application No. 201810031890.0, filed on Jan. 12, 2018. All of the aforementioned patent applications are hereby incorporated by reference in their entireties.

TECHNICAL FIELD

Embodiments of the present disclosure relate to the field of communications technologies, and in particular, to a resource configuration method and apparatus and a storage medium.

BACKGROUND

A narrowband internet of things (NB-IoT) system is a narrowband system used by a machine type device to perform wireless communication. Currently, when the NB-IoT system and a long term evolution (LTE) system coexist in a spectrum sharing manner, to avoid interference between the NB-IoT system and the LTE system, it is stipulated in an existing standard that when the NB-IoT system operates in the LTE system in an inband mode, not only a location of an NB-IoT anchor carrier needs to satisfy N×100 kHz, but also an NB-IoT raster needs to be basically aligned with an LTE resource block (RB), so that the LTE system can schedule the RB to avoid mutual interference with the NB-IoT system.

In a scenario in which a new radio access technology (New RAT, NR) system and the NB-IoT system coexist in a spectrum sharing manner, if the foregoing manner is still used to determine the location of the NB-IoT anchor carrier, a location at which the anchor carrier may be deployed is quite limited. Consequently, resource configuration flexibility is relatively low. To support flexible deployment of the NB-IoT system, a problem of mutual interference between the NB-IoT system and the NR system further needs to be resolved.

SUMMARY

Embodiments of the present disclosure provide a resource configuration method and apparatus and a storage medium, to improve resource configuration flexibility in a system.

A first aspect of the present disclosure provides a resource configuration method, including:

sending, by a network device, first information to a terminal, where the first information is used by the terminal to determine not to send data and/or receive data on a first resource; and the first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource.

In this solution, the first indication information includes index information of the first RB or bitmap information of the first RB. An index of the first RB may be a cell common index, or may be an index defined for the terminal based on a bandwidth part (BWP). The bitmap information may be a common bitmap, or may be a BWP-based bitmap. The network device may use the first indication information to indicate an RB on which the first resource is located. After determining the RB, the terminal further needs to determine, based on the second indication information, the subcarrier occupied by the first resource on the first RB, to determine the reserved first resource. In addition, the network device may alternatively use the third indication information to indicate the first subcarrier, where the third indication information may include index information or bitmap information of the first subcarrier, and the terminal determines the reserved first resource based on the first subcarrier.

After determining the first resource, the NR terminal does not send data and/or receive data on the first resource.

In the foregoing solution, the network device sends, to the terminal, the first information including the first indication information used to indicate the first RB and the second indication information used to indicate the subcarrier occupied by the first resource on the first RB, or including the third indication information used to indicate the first subcarrier. In this case, the terminal may determine the first resource based on the first indication information and the second indication information, or determine the first resource based on the first subcarrier indicated in the third indication information, and the terminal skips receiving and/or sending data on the determined first resource. This effectively avoids interference between an NR system and an NB-IoT system, and can improve resource configuration flexibility in the NB-IoT system.

In one embodiment, the second indication information includes at least one of the following information:

a quantity of subcarriers occupied by the first resource on the first RB;

an offset between a second subcarrier of the first resource and a third subcarrier of the first RB, where the second subcarrier includes the $1^{st}$ subcarrier of the first resource, and the third subcarrier includes the $1^{st}$ subcarrier of the first RB; or identifier information of the subcarrier occupied by the first resource on the first RB.

In one embodiment, subcarriers occupied by the first resource further include a subcarrier occupied by the first resource on a second RB, the first RB and the second RB are contiguous RBs, the subcarrier occupied by the first resource on the first RB and the subcarrier occupied by the first resource on the second RB are contiguous subcarriers, and a sum of the quantity of subcarriers occupied by the first resource on the first RB and a quantity of subcarriers occupied by the first resource on the second RB is 12.

In this solution, the network device can determine, by indicating the quantity of subcarriers occupied by the first resource on the first RB, the quantity of subcarriers occupied by the first resource on the second RB, to determine the subcarriers occupied by the first resource.

In addition, the second subcarrier may alternatively be the $6^{th}$ or the $7^{th}$ subcarrier of the first resource, and the third subcarrier may alternatively be the $6^{th}$ or the $7^{th}$ subcarrier of the first RB. In other words, when the second subcarrier is the $m^{th}$ subcarrier of the first resource, the third subcarrier is the $m^{th}$ subcarrier of the first RB.

In the foregoing solution, the first indication information includes the index information of the first RB or the bitmap information of the first RB, to indicate the first RB, and the second indication information includes at least one of the quantity of subcarriers occupied by the first resource on the first RB, the offset between the second subcarrier of the first resource and the third subcarrier of the first RB, or the identifier information of the subcarrier occupied by the first resource on the first RB, to indicate the subcarrier occupied by the first resource on the first RB. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, subcarriers occupied by the first resource are N contiguous subcarriers including the first subcarrier.

In one embodiment, N is 12n or 12n+1, where n is a nonnegative integer.

For example, N may be 12, 24, 36, 48, 60, 72, or 73.

In this solution, the first information includes the third indication information used to indicate the first subcarrier. The third indication information may be the index information or the bitmap information of the first subcarrier. An index of the first subcarrier may be a cell common index, or may be an index defined for the terminal based on a bandwidth part (BWP). The bitmap information may be a common bitmap, or may be a BWP-based bitmap. Alternatively, the third indication information includes index information or bitmap information of an RB on which the first subcarrier is located, and index information or bitmap information of the first subcarrier on the RB. An index of the RB on which the first subcarrier is located may be a cell common index, or may be an index defined for the terminal based on a BWP. The bitmap information may be a common bitmap, or may be a BWP-based bitmap. After receiving the third indication information sent by the network device, the terminal determines the first resource based on the first subcarrier indicated in the third indication information. The subcarriers occupied by the first resource are N contiguous subcarriers including the first subcarrier.

The first subcarrier may be the $1^{st}$ subcarrier of the first resource, and the third indication information may include the bitmap information or the index information of the first subcarrier. The terminal determines the first subcarrier based on the bitmap information or the index information of the first subcarrier, and uses N contiguous subcarriers starting from the first subcarrier as the subcarriers occupied by the first resource.

In the foregoing solution, the third indication information is used to indicate the first subcarrier, and the first subcarrier is used to determine the first resource. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the third indication information is used to indicate the first subcarrier and a quantity of contiguous subcarriers occupied by the first resource, and the quantity of contiguous subcarriers occupied by the first resource is 12, 24, 36, 48, 60, 72, or 73.

In this solution, the third indication information indicates the first subcarrier and the quantity N of contiguous subcarriers occupied by the first resource. After receiving the third indication information sent by the network device, the terminal determines the first resource based on the first subcarrier and the quantity N of contiguous subcarriers that are indicated in the third indication information. The subcarriers occupied by the first resource are N contiguous subcarriers including the first subcarrier.

The third indication information indicates a resource indication value (RIV), and an RIV value has a mapping relationship with a resource determined based on the N contiguous subcarriers starting from the first subcarrier. When the RIV has a different value, the $1^{st}$ subcarrier and/or the quantity N of contiguous subcarriers of the resource corresponding to the RIV are/is different.

Alternatively, the third indication information includes first-subcarrier indication information and contiguous-subcarrier quantity indication information, the first-subcarrier indication information is used to determine a start subcarrier or a center subcarrier of the first resource, and the contiguous-subcarrier quantity indication information is used to determine subcarriers occupied by the first resource. In this case, if the third indication information does not include the contiguous-subcarrier quantity indication information, the terminal may use a predefined default quantity N of subcarriers as the reserved resource.

In the foregoing solution, the third indication information is used to indicate the first subcarrier and the quantity of contiguous subcarriers occupied by the first resource, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first indication information is further used to indicate a third RB, and the second indication information is further used to indicate a subcarrier occupied by the first resource on the third RB. Subcarriers occupied by the first resource are contiguous subcarriers from the subcarrier occupied by the first resource on the first RB to the subcarrier occupied by the first resource on the third RB.

In this solution, when using the second indication information to indicate the subcarrier occupied by the first resource on the first RB, the network device also uses the second indication information to indicate the subcarrier occupied by the first resource on the third RB. In other words, the network device needs to notify the terminal of a subcarrier occupied by the first resource on an RB with a smallest index value and a subcarrier occupied by the first resource on an RB with a largest index value. In this case, the subcarriers occupied by the first resource are contiguous subcarriers from the subcarrier occupied by the first resource on the first RB to the subcarrier occupied by the first resource on the third RB.

In the foregoing solution, when the first resource with a frequency band resource larger than a frequency band resource used by the NB-IoT system needs to be reserved, the first indication information may also be used to indicate the third RB, and the second indication information may also be used to indicate the subcarrier occupied by the first resource on the third RB. The subcarriers occupied by the first resource are contiguous subcarriers from the subcarrier occupied by the first resource on the first RB to the subcarrier occupied by the first resource on the third RB. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first information further includes fourth indication information and fifth indication information.

The fourth indication information is used to indicate a subcarrier on which a resource element RE is located, and the fifth indication information is used to indicate a symbol in which the RE is located. The first resource is an RE determined by the terminal based on the first indication information, the second indication information, the fourth indication information, and the fifth indication information; or the first resource is an RE determined by the terminal based on the third indication information, the fourth indication information, and the fifth indication information.

In this solution, the network device may predefine several REs, and the REs are REs used to transmit a narrowband reference signal (NRS) in the NB-IoT system. When being sent to the terminal device, the first information may further include the fourth indication information and the fifth indication information. The fourth indication information is used to indicate the subcarrier on which the predefined RE is located, and the fifth indication information is used to indicate the symbol in which the RE is located. After receiving the first information sent by the network device, the terminal determines, based on the first indication information and the second indication information, a resource occupied by an entire RB of an NB-IoT carrier, and then determines several REs based on the fourth indication information and the fifth indication information; or after receiving the first information sent by the network device, the terminal determines, based on the third indication information, a resource occupied by an entire RB of an NB-IoT carrier, and then determines several REs based on the fourth indication information and the fifth indication information. In this case, the first resource is the REs determined by the terminal.

The fourth indication information includes index information or bitmap information of the subcarrier on which the RE is located. The fifth indication information includes index information of the symbol in one slot or bitmap information of the symbol in one slot.

In the foregoing solution, the network device may use the fourth indication information to indicate the subcarrier on which the RE is located, and use the fifth indication information to indicate the symbol in which the RE is located. In this case, the terminal may determine the RE based on the first indication information, the second indication information, the fourth indication information, and the fifth indication information, or determine the RE based on the third indication information, the fourth indication information, and the fifth indication information. In this way, when no downlink data is transmitted on the NB-IoT carrier, the NR terminal can use a resource on the NB-IoT carrier other than a resource reserved for the NRS. This can further improve spectral efficiency, and avoid a spectrum resource waste.

In one embodiment, the first information further includes sixth indication information. The sixth indication information is used to indicate at least one symbol in a first time period. The first resource is a resource determined by the terminal based on the first indication information, the second indication information, and the sixth indication information; or the first resource is a resource determined by the terminal based on the third indication information and the sixth indication information.

In the foregoing solution, the sixth indication information includes index information of a symbol occupied by the reserved resource in one slot or two slots, bitmap information of a symbol occupied by the reserved resource in one slot or two slots, or a start symbol of a symbol occupied by the reserved resource in one slot.

In this solution, the sixth indication information is used to indicate the at least one symbol in the first time period, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first information further includes seventh indication information. The seventh indication information is used to indicate at least one first time unit in a second time period, and the first time unit is a time length of the first time period.

The first resource is a resource determined by the terminal based on the first indication information, the second indication information, the sixth indication information, and the seventh indication information; or the first resource is a resource determined by the terminal based on the third indication information, the sixth indication information, and the seventh indication information; or the first resource is a resource determined by the terminal based on the first indication information, the second indication information, and the seventh indication information; or the first resource is a resource determined by the terminal based on the third indication information and the seventh indication information.

In this solution, the seventh indication information includes index information of one slot or two slots in a specified period, or the seventh indication information includes bitmap information of one slot or two slots in a specified period. The specified period is longer than or equal to one slot, or is longer than or equal to two slots.

In this solution, the seventh indication information is used to indicate the at least one first time unit in the second time period, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

A second aspect of the present disclosure provides a resource configuration method, including:

receiving, by a terminal, first information sent by a network device, where the first information is used by the terminal to determine not to send data and/or receive data on a first resource; and the first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource; and determining, by the terminal, the first resource based on the first information.

In this solution, the first indication information includes index information of the first RB or bitmap information of the first RB. An index of the first RB may be a cell common index, or may be an index defined for the terminal based on a bandwidth part (BWP). The bitmap information may be a common bitmap, or may be a BWP-based bitmap. The network device may use the first indication information to indicate an RB on which the first resource is located. After determining the RB, the terminal further needs to determine, based on the second indication information, the subcarrier occupied by the first resource on the first RB, to determine the reserved first resource. In addition, the network device may alternatively use the third indication information to indicate the first subcarrier, where the third indication information may include index information or bitmap information of the first subcarrier, and the terminal determines the reserved first resource based on the first subcarrier.

After determining the first resource, the NR terminal does not send data and/or receive data on the first resource.

In the foregoing solution, the network device sends, to the terminal, the first information including the first indication information used to indicate the first RB and the second indication information used to indicate the subcarrier occupied by the first resource on the first RB, or including the third indication information used to indicate the first subcarrier. In this case, the terminal may determine the first resource based on the first indication information and the second indication information, or determine the first resource based on the first subcarrier indicated in the third indication information, and the terminal skips receiving and/or sending data on the determined first resource. This effectively avoids interference between an NR system and an NB-IoT system, and can improve resource configuration flexibility in the NB-IoT system.

In one embodiment, the second indication information includes at least one of the following information:

a quantity of subcarriers occupied by the first resource on the first RB;

an offset between a second subcarrier of the first resource and a third subcarrier of the first RB, where the second subcarrier includes the $1^{st}$ subcarrier of the first resource, and the third subcarrier includes the $1^{st}$ subcarrier of the first RB; or identifier information of the subcarrier occupied by the first resource on the first RB.

In one embodiment, subcarriers occupied by the first resource further include a subcarrier occupied by the first resource on a second RB, the first RB and the second RB are contiguous RBs, the subcarrier occupied by the first resource on the first RB and the subcarrier occupied by the first resource on the second RB are contiguous subcarriers, and a sum of the quantity of subcarriers occupied by the first resource on the first RB and a quantity of subcarriers occupied by the first resource on the second RB is 12.

In this solution, the network device can determine, by indicating the quantity of subcarriers occupied by the first resource on the first RB, the quantity of subcarriers occupied by the first resource on the second RB, to determine the subcarriers occupied by the first resource.

In addition, the second subcarrier may alternatively be the $6^{th}$ or the $7^{th}$ subcarrier of the first resource, and the third subcarrier may alternatively be the $6^{th}$ or the $7^{th}$ subcarrier of the first RB. In other words, when the second subcarrier is the $m^{th}$ subcarrier of the first resource, the third subcarrier is the $m^{th}$ subcarrier of the first RB.

In the foregoing solution, the first indication information includes the index information of the first RB or the bitmap information of the first RB, to indicate the first RB, and the second indication information includes at least one of the quantity of subcarriers occupied by the first resource on the first RB, the offset between the second subcarrier of the first resource and the third subcarrier of the first RB, or the identifier information of the subcarrier occupied by the first resource on the first RB, to indicate the subcarrier occupied by the first resource on the first RB. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, subcarriers occupied by the first resource are N contiguous subcarriers including the first subcarrier.

In one embodiment, N is 12n or 12n+1, where n is a nonnegative integer.

For example, N may be 12, 24, 36, 48, 60, 72, or 73.

In this solution, the first information includes the third indication information used to indicate the first subcarrier. After receiving the third indication information sent by the network device, the terminal determines the first resource based on the first subcarrier indicated in the third indication information. The subcarriers occupied by the first resource are N contiguous subcarriers including the first subcarrier.

The first subcarrier may be the $1^{st}$ subcarrier of the first resource, and the third indication information may include the bitmap information or the index information of the first subcarrier. The terminal determines the first subcarrier based on the bitmap information or the index information of the first subcarrier, and uses N contiguous subcarriers starting from the first subcarrier as the subcarriers occupied by the first resource.

In the foregoing solution, the third indication information is used to indicate the first subcarrier, and the first subcarrier is used to determine the first resource. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the third indication information is used to indicate the first subcarrier and a quantity of contiguous subcarriers occupied by the first resource, and the quantity of contiguous subcarriers occupied by the first resource is 12, 24, 36, 48, 60, 72, or 73.

In this solution, the third indication information indicates the first subcarrier and the quantity N of contiguous subcarriers occupied by the first resource. After receiving the third indication information sent by the network device, the terminal determines the first resource based on the first subcarrier and the quantity N of contiguous subcarriers that are indicated in the third indication information. The subcarriers occupied by the first resource are N contiguous subcarriers including the first subcarrier.

The third indication information indicates a resource indication value (RIV), and an RIV value has a mapping relationship with a resource determined based on the N contiguous subcarriers starting from the first subcarrier. When the RIV has a different value, the $1^{st}$ subcarrier and/or the quantity N of contiguous subcarriers of the resource corresponding to the RIV are/is different.

Alternatively, the third indication information includes first-subcarrier indication information and contiguous-subcarrier quantity indication information, the first-subcarrier indication information is used to determine a start subcarrier or a center subcarrier of the first resource, and the contiguous-subcarrier quantity indication information is used to determine subcarriers occupied by the first resource. In this case, if the third indication information does not include the contiguous-subcarrier quantity indication information, the terminal may use a predefined default quantity N of subcarriers as the reserved resource.

In the foregoing solution, the third indication information is used to indicate the first subcarrier and the quantity of contiguous subcarriers occupied by the first resource, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first indication information is further used to indicate a third RB, and the second indication information is further used to indicate a subcarrier occupied by the first resource on the third RB. Subcarriers occupied by the first resource are contiguous subcarriers from the subcarrier occupied by the first resource on the first RB to the subcarrier occupied by the first resource on the third RB.

In this solution, when using the second indication information to indicate the subcarrier occupied by the first resource on the first RB, the network device also uses the second indication information to indicate the subcarrier occupied by the first resource on the third RB. In other words, the network device needs to notify the terminal of a subcarrier occupied by the first resource on an RB with a smallest index value and a subcarrier occupied by the first resource on an RB with a largest index value. In this case, the subcarriers occupied by the first resource are contiguous subcarriers from the subcarrier occupied by the first resource on the first RB to the subcarrier occupied by the first resource on the third RB.

In the foregoing solution, when the first resource with a frequency band resource larger than a frequency band resource used by the NB-IoT system needs to be reserved, the first indication information may also be used to indicate the third RB, the second indication information may also be used to indicate the subcarrier occupied by the first resource on the third RB, and the subcarriers occupied by the first resource are contiguous subcarriers from the subcarrier occupied by the first resource on the first RB to the subcarrier occupied by the first resource on the third RB. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first information further includes fourth indication information and fifth indication information.

The fourth indication information is used to indicate a subcarrier on which a resource element RE is located, and the fifth indication information is used to indicate a symbol in which the RE is located. The first resource is an RE determined by the terminal based on the first indication information, the second indication information, the fourth indication information, and the fifth indication information; or the first resource is an RE determined by the terminal based on the third indication information, the fourth indication information, and the fifth indication information.

In this solution, the network device may predefine several REs, and the REs are REs used to transmit an NRS in the NB-IoT system. When being sent to the terminal device, the first information may further include the fourth indication information and the fifth indication information. The fourth indication information is used to indicate the subcarrier on which the predefined RE is located, and the fifth indication information is used to indicate the symbol in which the RE is located. After receiving the first information sent by the network device, the terminal determines, based on the first indication information and the second indication information, a resource occupied by an entire RB of an NB-IoT carrier, and then determines several REs based on the fourth indication information and the fifth indication information; or after receiving the first information sent by the network device, the terminal determines, based on the third indication information, a resource occupied by an entire RB of an NB-IoT carrier, and then determines several REs based on the fourth indication information and the fifth indication information. In this case, the first resource is the REs determined by the terminal.

The fourth indication information includes index information or bitmap information of the subcarrier on which the RE is located. The fifth indication information includes index information of the symbol in one slot or bitmap information of the symbol in one slot.

In the foregoing solution, the network device may use the fourth indication information to indicate the subcarrier on which the RE is located, and use the fifth indication information to indicate the symbol in which the RE is located. In this case, the terminal may determine the RE based on the first indication information, the second indication information, the fourth indication information, and the fifth indication information, or determine the RE based on the third indication information, the fourth indication information, and the fifth indication information. In this way, when no downlink data is transmitted on the NB-IoT carrier, the NR terminal can use a resource on the NB-IoT carrier other than a resource reserved for the NRS. This can further improve spectral efficiency, and avoid a spectrum resource waste.

In one embodiment, the first information further includes sixth indication information. The sixth indication information is used to indicate at least one symbol in a first time period. The first resource is a resource determined by the terminal based on the first indication information, the second indication information, and the sixth indication information; or the first resource is a resource determined by the terminal based on the third indication information and the sixth indication information.

In the foregoing solution, the sixth indication information includes index information of a symbol occupied by the reserved resource in one slot or two slots, bitmap information of a symbol occupied by the reserved resource in one slot or two slots, or a start symbol of a symbol occupied by the reserved resource in one slot.

In this solution, the sixth indication information is used to indicate the at least one symbol in the first time period, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first information further includes seventh indication information. The seventh indication information is used to indicate at least one first time unit in a second time period, and the first time unit is a time length of the first time period.

The first resource is a resource determined by the terminal based on the first indication information, the second indication information, the sixth indication information, and the seventh indication information; or the first resource is a resource determined by the terminal based on the third indication information, the sixth indication information, and the seventh indication information; or the first resource is a resource determined by the terminal based on the first indication information, the second indication information, and the seventh indication information; or the first resource is a resource determined by the terminal based on the third indication information and the seventh indication information.

In this solution, the seventh indication information includes index information of one slot or two slots in a specified period, or the seventh indication information includes bitmap information of one slot or two slots in a specified period. The specified period is longer than or equal to one slot, or is longer than or equal to two slots.

In this solution, the seventh indication information is used to indicate the at least one first time unit in the second time period, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

A third aspect of the present disclosure provides a resource configuration method, including:

sending, by a network device, first information to a terminal, where the first information is used by the terminal to determine not to send data and/or receive data on a first resource; the first information includes first indication information and second indication information, the first indication information is used to indicate a frequency location of a center subcarrier in a first system, and the second indication information is used to indicate a frequency location, in the first system, of a resource occupied by a second system; and the frequency location, in the first system, of the resource occupied by the second system is used to determine the first resource.

In this solution, the first indication information may be used to indicate the frequency location of the center subcarrier in the first system, the second indication information is used to indicate the frequency location, in the first system, of the resource occupied by the second system, and the frequency location, in the first system, of the resource occupied by the second system is used to determine the first resource.

The first system may be, for example, an LTE system, and the second system may be, for example, an NB-IoT system. The second indication information may be evolved universal terrestrial radio access (E-UTRA) cell-specific reference signal sequence information (eutra-CRS-SequenceInfo).

In the foregoing solution, the network device sends, to the terminal, the first information including the first indication information used to indicate the frequency location of the center subcarrier in the first system and the second indication information used to indicate the frequency location, in the first system, of the resource occupied by the second system. In this case, the terminal may determine the first resource based on the first indication information and the second indication information, and the terminal skips receiving and/or sending data on the determined first resource. This effectively avoids interference between an NR system and an NB-IoT system, and can improve resource configuration flexibility in the NB-IoT system.

In one embodiment, the first information further includes third indication information. The third indication information is used to indicate at least one symbol in a first time period. The first resource is a resource determined by the terminal based on the first indication information, the second indication information, and the third indication information.

In this solution, the third indication information may be indication information indicating the reserved resource in time domain, for example, may be start symbol indication information, and the third indication information indicates a start symbol of a resource occupied by the reserved resource in one subframe or one slot. The terminal may determine, based on the third indication information, a symbol occupied by the NB-IoT system in one subframe. After receiving the first information sent by the network device, the terminal may determine the first resource based on the first indication information, the second indication information, and the third indication information that are in the first information.

In the foregoing solution, the third indication information is used to indicate the at least one symbol in the first time period, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first information further includes fourth indication information. The fourth indication information is used to indicate a subframe or a slot occupied by the first resource. The first resource is a resource determined by the terminal based on the first indication information, the second indication information, and the fourth indication information; or the first resource is a resource determined by the terminal based on the first indication information, the second indication information, the third indication information, and the fourth indication information.

In this solution, the fourth indication information may be bitmap information of a valid downlink subframe, and the fourth indication information may be used to indicate which downlink subframes are occupied by the reserved resource in a 10-millisecond period or a 40-millisecond period. In this case, the first indication information, the second indication information, and the fourth indication information may be used to indicate a symbol and a subcarrier that are occupied by the reserved resource. Correspondingly, the terminal device may determine the first resource, namely, the reserved resource, based on the first indication information, the second indication information, and the fourth indication information that are sent by the network device.

In addition, the first resource may alternatively be the resource determined by the terminal based on the first indication information, the second indication information, the third indication information, and the fourth indication information. Specifically, a subcarrier occupied by the reserved resource in frequency domain may be determined based on the first indication information, the second indication information, the third indication information, and the fourth indication information, and a subframe and a symbol in each subframe that are occupied by the reserved resource in the time domain are determined, so that a resource occupied by the reserved resource is determined. Correspondingly, the terminal device may determine the reserved resource based on the first indication information, the second indication information, the third indication information, and the fourth indication information.

In one embodiment, the first information further includes fifth indication information and sixth indication information. The fifth indication information is used to indicate an offset, on one RB, of a downlink narrowband reference signal (NRS) or an offset, on one RB, of a cell-specific reference signal (CRS), and the sixth indication information is used to indicate a quantity of NRS ports. The first resource is a resource determined by the terminal based on the first indication information, the second indication information, the fifth indication information, and the sixth indication information; or the first resource is a resource determined by the terminal based on the first indication information, the second indication information, the fourth indication information, the fifth indication information, and the sixth indication information.

In addition, when the first information further indicates a quantity of CRS ports, if the quantity of CRS ports is 1 or 2, the first information may not indicate the quantity of NRS ports, or if the quantity of CRS ports is 4, the first information needs to indicate the quantity of NRS ports. Therefore, if the quantity of NRS ports is not indicated, the quantity of NRS ports is equal to the quantity of CRS ports. When the quantity of CRS ports is 1 or 2, the network device does not notify the terminal of the quantity of NRS ports. This can reduce signaling overheads.

A fourth aspect of the present disclosure provides a resource configuration method, including:

receiving, by a terminal, first information sent by a network device, where the first information is used by the terminal to determine not to send data and/or receive data on a first resource; the first information includes first indication information and second indication information, the first indication information is used to indicate a frequency location of a center subcarrier in a first system, and the second indication information is used to indicate a frequency location, in the first system, of a resource occupied by a second system; and the frequency location, in the first system, of the resource occupied by the second system is used to determine the first resource; and determining, by the terminal, the first resource based on the first information.

In this solution, the first indication information may be used to indicate the frequency location of the center subcarrier in the first system, the second indication information is used to indicate the frequency location, in the first system, of the resource occupied by the second system, and the frequency location, in the first system, of the resource occupied by the second system is used to determine the first resource.

The first system may be, for example, an LTE system, and the second system may be, for example, an NB-IoT system. The second indication information may be evolved universal terrestrial radio access (E-UTRA) cell-specific reference signal sequence information (eutra-CRS-SequenceInfo).

In the foregoing solution, the network device sends, to the terminal, the first information including the first indication information used to indicate the frequency location of the center subcarrier in the first system and the second indication information used to indicate the frequency location, in the first system, of the resource occupied by the second system. In this case, the terminal may determine the first resource based on the first indication information and the second indication information, and the terminal skips receiving and/or sending data on the determined first resource. This effectively avoids interference between an NR system and an NB-IoT system, and can improve resource configuration flexibility in the NB-IoT system.

In one embodiment, the first information further includes third indication information. The third indication information is used to indicate at least one symbol in a first time period. The first resource is a resource determined by the terminal based on the first indication information, the second indication information, and the third indication information.

In this solution, the third indication information may be indication information indicating the reserved resource in time domain, for example, may be start symbol indication information, and the third indication information indicates a start symbol of a resource occupied by the reserved resource in one subframe or one slot. The terminal may determine, based on the third indication information, a symbol occupied by the NB-IoT system in one subframe. After receiving the first information sent by the network device, the terminal may determine the first resource based on the first indication information, the second indication information, and the third indication information that are in the first information.

In the foregoing solution, the third indication information is used to indicate the at least one symbol in the first time period, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, the first information further includes fourth indication information. The fourth indication information is used to indicate a subframe or a slot occupied by the first resource. The first resource is a resource determined by the terminal based on the first indication information, the second indication information, and the fourth indication information; or the first resource is a resource determined by the terminal based on the first indication information, the second indication information, the third indication information, and the fourth indication information.

In this solution, the fourth indication information may be bitmap information of a valid downlink subframe, and the fourth indication information may be used to indicate which downlink subframes are occupied by the reserved resource in a 10-millisecond period or a 40-millisecond period. In this case, the first indication information, the second indication information, and the fourth indication information may be used to indicate a symbol and a subcarrier that are occupied by the reserved resource. Correspondingly, the terminal device may determine the first resource, namely, the reserved resource, based on the first indication information, the second indication information, and the fourth indication information that are sent by the network device.

In addition, the first resource may alternatively be the resource determined by the terminal based on the first indication information, the second indication information, the third indication information, and the fourth indication information. Specifically, a subcarrier occupied by the reserved resource in frequency domain may be determined based on the first indication information, the second indication information, the third indication information, and the fourth indication information, and a subframe and a symbol in each subframe that are occupied by the reserved resource in the time domain are determined, so that a resource occupied by the reserved resource is determined. Correspondingly, the terminal device may determine the reserved resource based on the first indication information, the second indication information, the third indication information, and the fourth indication information.

In one embodiment, the first information further includes fifth indication information and sixth indication information. The fifth indication information is used to indicate an offset, on one RB, of a downlink narrowband reference signal (NRS) or an offset, on one RB, of a cell-specific reference signal (CRS), and the sixth indication information is used to indicate a quantity of NRS ports. The first resource is a resource determined by the terminal based on the first indication information, the second indication information, the fifth indication information, and the sixth indication information; or the first resource is a resource determined by the terminal based on the first indication information, the second indication information, the fourth indication information, the fifth indication information, and the sixth indication information.

In addition, when the first information further indicates a quantity of CRS ports, if the quantity of CRS ports is 1 or 2, the first information may not indicate the quantity of NRS ports, or if the quantity of CRS ports is 4, the first information needs to indicate the quantity of NRS ports. Therefore, if the quantity of NRS ports is not indicated, the quantity of NRS ports is equal to the quantity of CRS ports. When the quantity of CRS ports is 1 or 2, the network device does not notify the terminal of the quantity of NRS ports. This can reduce signaling overheads.

A fifth aspect of the present disclosure provides a resource configuration apparatus, including:

a sending module, configured to send first information to a terminal, where the first information is used by the terminal to determine not to send data and/or receive data on a first resource; and the first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource.

In one embodiment, the second indication information includes at least one of the following information:

a quantity of subcarriers occupied by the first resource on the first RB;

an offset between a second subcarrier of the first resource and a third subcarrier of the first RB, where the second subcarrier includes the $1^{st}$ subcarrier of the first resource, and the third subcarrier includes the $1^{st}$ subcarrier of the first RB; or identifier information of the subcarrier occupied by the first resource on the first RB.

In one embodiment, subcarriers occupied by the first resource further include a subcarrier occupied by the first resource on a second RB, the first RB and the second RB are contiguous RBs, the subcarrier occupied by the first resource on the first RB and the subcarrier occupied by the first resource on the second RB are contiguous subcarriers, and a sum of the quantity of subcarriers occupied by the first resource on the first RB and a quantity of subcarriers occupied by the first resource on the second RB is 12.

In one embodiment, subcarriers occupied by the first resource are N contiguous subcarriers including the first subcarrier.

In one embodiment, N is 12n or 12n+1, where n is a nonnegative integer.

For example, N may be 12, 24, 36, 48, 60, 72, or 73.

In one embodiment, the third indication information is used to indicate the first subcarrier and a quantity of contiguous subcarriers occupied by the first resource, and the quantity of contiguous subcarriers occupied by the first resource is 12, 24, 36, 48, 60, 72, or 73.

In one embodiment, the first indication information is further used to indicate a third RB, and the second indication information is further used to indicate a subcarrier occupied by the first resource on the third RB. Subcarriers occupied by the first resource are contiguous subcarriers from the subcarrier occupied by the first resource on the first RB to the subcarrier occupied by the first resource on the third RB.

In one embodiment, the first information further includes fourth indication information and fifth indication information.

The fourth indication information is used to indicate a subcarrier on which a resource element RE is located, and the fifth indication information is used to indicate a symbol in which the RE is located. The first resource is an RE determined by the terminal based on the first indication information, the second indication information, the fourth indication information, and the fifth indication information; or the first resource is an RE determined by the terminal based on the third indication information, the fourth indication information, and the fifth indication information.

In one embodiment, the first information further includes sixth indication information. The sixth indication information is used to indicate at least one symbol in a first time period. The first resource is a resource determined by the terminal based on the first indication information, the second indication information, and the sixth indication information; or the first resource is a resource determined by the terminal based on the third indication information and the sixth indication information.

In one embodiment, the first information further includes seventh indication information. The seventh indication information is used to indicate at least one first time unit in a second time period, and the first time unit is a time length of the first time period.

The first resource is a resource determined by the terminal based on the first indication information, the second indication information, the sixth indication information, and the seventh indication information; or the first resource is a resource determined by the terminal based on the third indication information, the sixth indication information, and the seventh indication information; or the first resource is a resource determined by the terminal based on the first indication information, the second indication information, and the seventh indication information; or the first resource is a resource determined by the terminal based on the third indication information and the seventh indication information.

A sixth aspect of the present disclosure provides a resource configuration apparatus, including:

a receiving module, configured to receive first information sent by a network device, where the first information is used by a terminal to determine not to send data and/or receive data on a first resource; and the first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource; and a determining module, configured to determine the first resource based on the first information.

In one embodiment, the second indication information includes at least one of the following information:

a quantity of subcarriers occupied by the first resource on the first RB;

an offset between a second subcarrier of the first resource and a third subcarrier of the first RB, where the second subcarrier includes the $1^{st}$ subcarrier of the first resource, and the third subcarrier includes the $1^{st}$ subcarrier of the first RB; or identifier information of the subcarrier occupied by the first resource on the first RB.

In one embodiment, subcarriers occupied by the first resource further include a subcarrier occupied by the first resource on a second RB, the first RB and the second RB are contiguous RBs, the subcarrier occupied by the first resource on the first RB and the subcarrier occupied by the first resource on the second RB are contiguous subcarriers, and a sum of the quantity of subcarriers occupied by the first resource on the first RB and a quantity of subcarriers occupied by the first resource on the second RB is 12.

In one embodiment, subcarriers occupied by the first resource are N contiguous subcarriers including the first subcarrier.

In one embodiment, N is 12n or 12n+1, where n is a nonnegative integer.

For example, N may be 12, 24, 36, 48, 60, 72, or 73.

In one embodiment, the third indication information is used to indicate the first subcarrier and a quantity of contiguous subcarriers occupied by the first resource, and the quantity of contiguous subcarriers occupied by the first resource is 12, 24, 36, 48, 60, 72, or 73.

In one embodiment, the first indication information is further used to indicate a third RB, and the second indication information is further used to indicate a subcarrier occupied by the first resource on the third RB. Subcarriers occupied by the first resource are contiguous subcarriers from the subcarrier occupied by the first resource on the first RB to the subcarrier occupied by the first resource on the third RB.

In one embodiment, the first information further includes fourth indication information and fifth indication information.

The fourth indication information is used to indicate a subcarrier on which a resource element RE is located, and the fifth indication information is used to indicate a symbol in which the RE is located. The first resource is an RE determined by the terminal based on the first indication information, the second indication information, the fourth indication information, and the fifth indication information; or the first resource is an RE determined by the terminal based on the third indication information, the fourth indication information, and the fifth indication information.

In one embodiment, the first information further includes sixth indication information. The sixth indication information is used to indicate at least one symbol in a first time period. The first resource is a resource determined by the terminal based on the first indication information, the second indication information, and the sixth indication information; or the first resource is a resource determined by the terminal based on the third indication information and the sixth indication information.

In one embodiment, the first information further includes seventh indication information. The seventh indication information is used to indicate at least one first time unit in a second time period, and the first time unit is a time length of the first time period.

The first resource is a resource determined by the terminal based on the first indication information, the second indication information, the sixth indication information, and the seventh indication information; or the first resource is a resource determined by the terminal based on the third indication information, the sixth indication information, and the seventh indication information; or the first resource is a resource determined by the terminal based on the first indication information, the second indication information, and the seventh indication information; or the first resource is a resource determined by the terminal based on the third indication information and the seventh indication information.

A seventh aspect of the present disclosure provides a resource configuration apparatus, including:

a sending module, configured to send first information to a terminal, where the first information is used by the terminal to determine not to send data and/or receive data on a first resource; the first information includes first indication information and second indication information, the first indication information is used to indicate a frequency location of a center subcarrier in a first system, and the second indication information is used to indicate a frequency location, in the first system, of a resource occupied by a second system; and the frequency location, in the first system, of the resource occupied by the second system is used to determine the first resource.

In one embodiment, the first information further includes third indication information. The third indication information is used to indicate at least one symbol in a first time period. The first resource is a resource determined by the terminal based on the first indication information, the second indication information, and the third indication information.

In one embodiment, the first information further includes fourth indication information. The fourth indication information is used to indicate a subframe or a slot occupied by the first resource. The first resource is a resource determined by the terminal based on the first indication information, the second indication information, and the fourth indication information.

In one embodiment, the first information further includes fifth indication information and sixth indication information. The fifth indication information is used to indicate an offset, on one RB, of a downlink narrowband reference signal (NRS) or an offset, on one RB, of a cell-specific reference signal (CRS), and the sixth indication information is used to indicate a quantity of NRS ports. The first resource is a resource determined by the terminal based on the first indication information, the second indication information, the fifth indication information, and the sixth indication information.

An eighth aspect of the present disclosure provides a resource configuration apparatus, including:

a receiving module, configured to receive first information sent by a network device, where the first information is used by the terminal to determine not to send data and/or receive data on a first resource; the first information includes first indication information and second indication information, the first indication information is used to indicate a frequency location of a center subcarrier in a first system, and the second indication information is used to indicate a frequency location, in the first system, of a resource occupied by a second system; and the frequency location, in the first system, of the resource occupied by the second system is used to determine the first resource; and a determining module, configured to determine the first resource based on the first information.

In one embodiment, the first information further includes third indication information. The third indication information is used to indicate at least one symbol in a first time period. The first resource is a resource determined by the terminal based on the first indication information, the second indication information, and the third indication information.

In one embodiment, the first information further includes fourth indication information. The fourth indication information is used to indicate a subframe or a slot occupied by the first resource. The first resource is a resource determined by the terminal based on the first indication information, the second indication information, and the fourth indication information.

In one embodiment, the first information further includes fifth indication information and sixth indication information. The fifth indication information is used to indicate an offset, on one RB, of a downlink narrowband reference signal (NRS) or an offset, on one RB, of a cell-specific reference signal (CRS), and the sixth indication information is used to indicate a quantity of NRS ports. The first resource is a resource determined by the terminal based on the first indication information, the second indication information, the fifth indication information, and the sixth indication information.

A ninth aspect of the present disclosure provides a resource configuration apparatus, including at least one processing element (or chip) configured to perform the method in the first aspect or the third aspect.

A tenth aspect of the present disclosure provides a resource configuration apparatus, including at least one processing element (or chip) configured to perform the method in the second aspect or the fourth aspect.

An eleventh aspect of the present disclosure provides a program. The program is executed by a processor to perform the method in the first aspect or the third aspect.

A twelfth aspect of the present disclosure provides a program product, for example, a computer-readable storage medium, including the program in the eleventh aspect.

A thirteenth aspect of the present disclosure provides a program. The program is executed by a processor to perform the method in the second aspect or the fourth aspect.

A fourteenth aspect of the present disclosure provides a program product, for example, a computer-readable storage medium, including the program in the thirteenth aspect.

A fifteenth aspect of the present disclosure provides a readable storage medium, including a computer program or an instruction. The computer program or the instruction is executed to perform the method in the first aspect or the third aspect.

A sixteenth aspect of the present disclosure provides a readable storage medium, including a computer program or an instruction. The computer program or the instruction is executed to perform the method in the second aspect or the fourth aspect.

A seventeenth aspect of the present disclosure provides a chip system. The chip system includes a processor, configured to support a resource configuration apparatus to implement functions in the foregoing aspects, for example, generate or process data and/or information in the foregoing method. In a possible design, the chip system further includes a memory, and the memory is configured to store a program instruction and data that are appropriate for the resource configuration apparatus. The chip system may include a chip, or may include a chip and another discrete device.

According to the resource configuration method and apparatus, and the storage medium that are provided in the present disclosure, the first information is sent to the terminal. The first information is used by the terminal to determine not to send data and/or receive data on the first resource. The first information includes the first indication information used to indicate the first RB and the second indication information used to indicate the subcarrier occupied by the first resource on the first RB; or the first information includes the third indication information used to indicate the first subcarrier, and the first subcarrier is used to determine the first resource. The network device sends, to the terminal, the first information including the first indication information used to indicate the first RB and the second indication information used to indicate the subcarrier occupied by the first resource on the first RB, or including the third indication information used to indicate the first subcarrier. In this case, the terminal may determine the first resource based on the first indication information and the second indication information, or determine the first resource based on the first subcarrier indicated in the third indication information, and the terminal skips receiving and/or sending data on the determined first resource. This effectively avoids interference between the NR system and the NB-IoT system, and can improve resource configuration flexibility in the NB-IoT system.

DESCRIPTION OF EMBODIMENTS

In the following, some terms in the present disclosure are described, to help a person skilled in the art have a better understanding.

(1) A terminal, also referred to as user equipment (UE), a mobile station (MS), a mobile terminal (MT), or the like, is a device providing voice and/or data connectivity for a user. For example, the terminal is a handheld device or a vehicle-mounted device that has a wireless connection function. Currently, the terminal is, for example, a mobile phone (mobile phone), a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

(2) A network device may include but is not limited to a base station and a transmission reception point (TRP). The base station, also referred to as a radio access network (RAN) device, is a device connecting a terminal device to a wireless network. The base station may be a base transceiver station (BTS) in global system of mobile communications (GSM) or code division multiple access (CDMA), a NodeB (NB) in wideband code division multiple access (WCDMA), an evolved NodeB (eNB or eNodeB) in long term evolution (LTE), a relay station, an access point, or a base station on a future 5th generation (5G) network, or the like. This is not limited herein.

Figure 1:
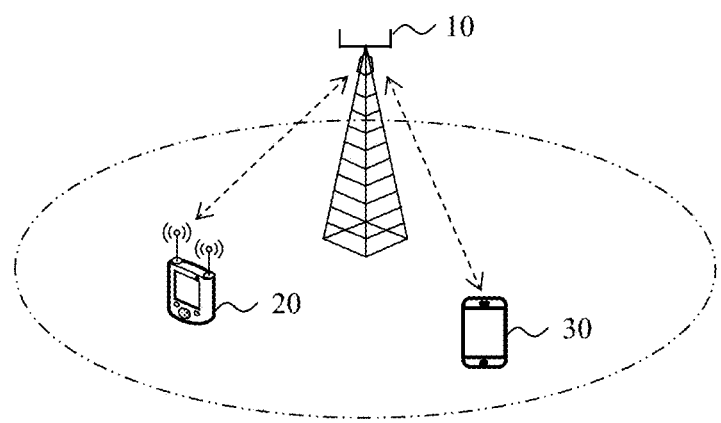
FIG. 1 is a schematic diagram of an architecture when an NR system and an NB-IoT system coexist.

A person skilled in the art may understand that a resource configuration method provided in the embodiments of the present disclosure may be applied to a 5G NR system and a subsequent evolved communications system, or may be applied to another wireless communications network, for example, a universal mobile telecommunications system (UMTS) network, provided that a resource needs to be reserved in the communications system. FIG. 1 is a schematic diagram of an architecture when an NR system and an NB-IoT system coexist. As shown in FIG. 1, the system includes a base station 10, a terminal 20, and a terminal 30. The terminal 20 and the terminal 30 may be, for example, UEs. The terminal 20 may be an NR terminal, and the terminal 30 may be an NB-IoT terminal. Both the terminal 20 and the terminal 30 fall in a service range of the same base station 10.

Based on the system architecture shown in FIG. 1, when the NB-IoT system operates in an LTE system in an inband mode, not only a location of an NB-IoT anchor carrier needs to satisfy N×100 kHz, but also an NB-IoT raster needs to be substantially aligned with one LTE RB. When the LTE system and the NB-IoT system coexist in a spectrum sharing manner, to ensure that an NB-IoT raster is substantially aligned with one LTE RB, a location at which the anchor carrier may be deployed is quite limited. Consequently, resource configuration flexibility is relatively low.

Considering these situations, the embodiments of the present disclosure provide a resource configuration method. In the method, a network device sends first information to a terminal. The first information is used by the terminal to determine not to send data and/or receive data on a first resource. The first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource. The network device sends, to the terminal, the first information including the first indication information used to indicate the first RB and the second indication information used to indicate the subcarrier occupied by the first resource on the first RB, or including the third indication information used to indicate the first subcarrier. In this case, the terminal may determine the first resource based on the first indication information and the second indication information, or determine the first resource based on the first subcarrier indicated in the third indication information, and the terminal skips receiving and/or sending data on the determined first resource. This effectively avoids interference between the NR system and the NB-IoT system, and can improve resource configuration flexibility in the NB-IoT system.

Figure 2:
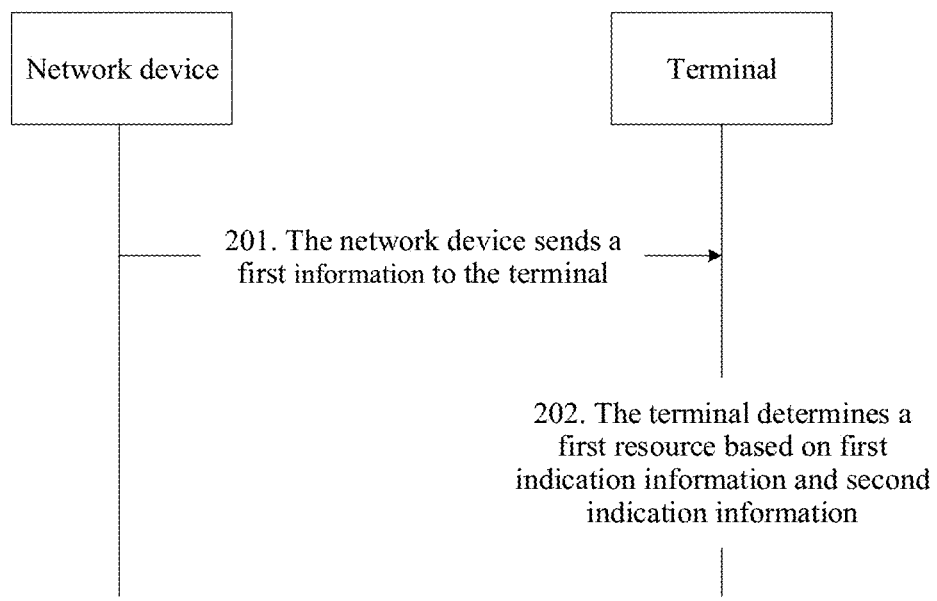
FIG. 2 is a signaling flowchart of Embodiment 1 of a resource configuration method according to the present disclosure.

FIG. 2 is a signaling flowchart of Embodiment 1 of a resource configuration method according to the present disclosure. The present disclosure is described by using an example in which an NR system and an NB-IoT system coexist in a spectrum sharing manner. A resource configuration manner in another communications system is similar to a resource configuration manner in the NR system and the NB-IoT system. Details are not described in the present disclosure. Based on the system architecture shown in FIG. 1, as shown in FIG. 2, the method in this embodiment may include the following operations.

Operation 201: A network device sends first information to a terminal.

In this embodiment, the first information is used by the terminal to determine not to send data and/or receive data on a first resource. The first information includes first indication information and second indication information, where the first indication information is used to indicate a first RB, and the second indication information is used to indicate a subcarrier occupied by the first resource on the first RB; or the first information includes third indication information, where the third indication information is used to indicate a first subcarrier, and the first subcarrier is used to determine the first resource.

Operation 202: The terminal determines the first resource based on the first information.

The terminal does not send data and/or receive data on the first resource.

In one embodiment, before sending the first information to the terminal, the network device first needs to determine the first resource. The terminal is an NR terminal, and the first resource is a resource reserved by the network device for an NB-IoT terminal. To be specific, the NR terminal performs rate matching near the first resource in a data transmission process, and skips sending data and/or receiving data on the first resource. In actual application, the network device may determine, based on interference between the NR system and the NB-IoT system, an RB on which the to-be-reserved first resource is located and a subcarrier occupied by the first resource on the RB.

The following first describes the interference between the NR system and the NB-IoT system in detail. In frequency domain, the interference generated between the NR system and the NB-IoT system may have the following cases:

(1) Interference is generated when an NR subcarrier spacing is different from an NB-IoT subcarrier spacing.

Figure 3A:
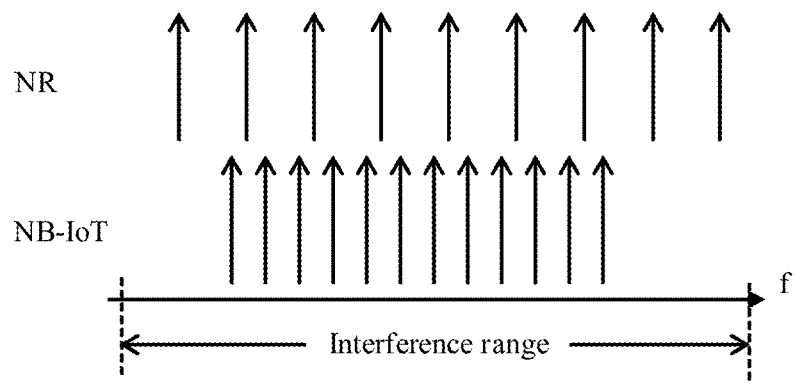
FIG. 3a is a schematic diagram of interference generated when an NR subcarrier spacing is different from an NB-IoT subcarrier spacing.

In the NB-IoT system, only a subcarrier spacing 15 kHz is supported in downlink in the frequency domain, while in the NR system, subcarrier spacings 15 kHz, 30 kHz, and 60 kHz may be supported in an LTE frequency band. When the subcarrier spacings in the two systems are different and occupied frequency bands overlap, the two systems interfere with each other, and an interference range is larger than an overlapping range. FIG. 3a is a schematic diagram of interference generated when an NR subcarrier spacing is different from an NB-IoT subcarrier spacing. As shown in FIG. 3a, for example, when the NR subcarrier spacing is 30 kHz, the NB-IoT subcarrier spacing is 15 kHz, and the NR subcarrier overlaps with the NB-IoT subcarrier, a mutual interference range between the NR system and the NB-IoT system is larger than an overlapping area.

(2) Interference is generated when an NR subcarrier spacing is the same as an NB-IoT subcarrier spacing but an NR subcarrier is not aligned with an NB-IoT subcarrier.

Figure 3B:
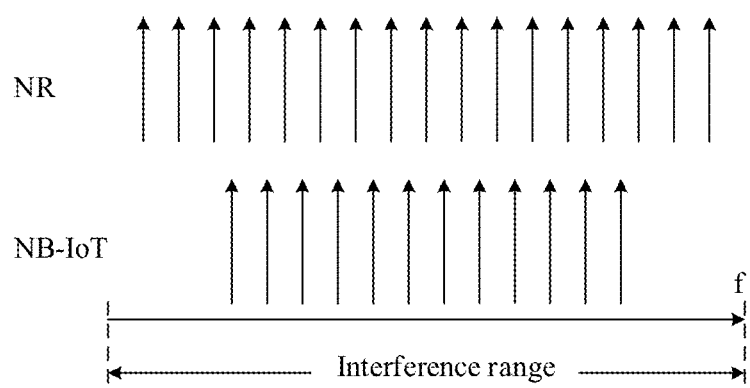
FIG. 3b is a schematic diagram of interference generated when an NR subcarrier spacing is the same as an NB-IoT subcarrier spacing but an NR subcarrier is not aligned with an NB-IoT subcarrier.

FIG. 3b is a schematic diagram of interference generated when an NR subcarrier spacing is the same as an NB-IoT subcarrier spacing but an NR subcarrier is not aligned with an NB-IoT subcarrier. As shown in FIG. 3b, when the NR subcarrier spacing is the same as the NB-IoT subcarrier spacing (where for example, both are 15 kHz), if the NR subcarrier is not aligned with the NB-IoT subcarrier, the two systems still interfere with each other, and an interference range is larger than an overlapping range.

(3) Interference is generated when an NR subcarrier spacing is the same as an NB-IoT subcarrier spacing and an NR subcarrier is aligned with an NB-IoT subcarrier.

Figure 3C:
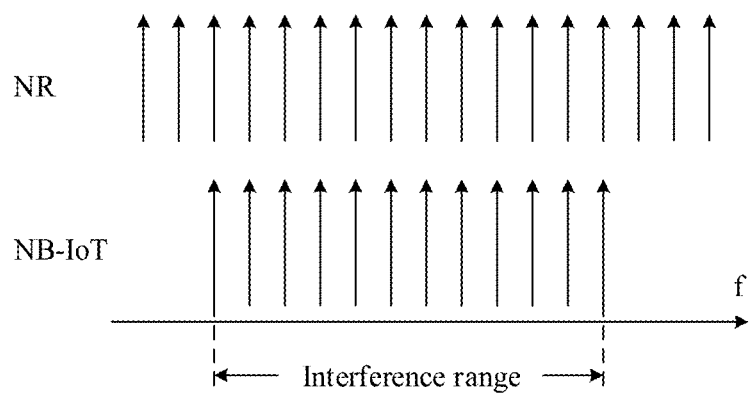
FIG. 3c is a schematic diagram of interference generated when an NR subcarrier spacing is the same as an NB-IoT subcarrier spacing and an NR subcarrier is aligned with an NB-IoT subcarrier.

FIG. 3c is a schematic diagram of interference generated when an NR subcarrier spacing is the same as an NB-IoT subcarrier spacing and an NR subcarrier is aligned with an NB-IoT subcarrier. As shown in FIG. 3c, when the NR subcarrier spacing is the same as the NB-IoT subcarrier spacing, and the NR subcarrier is aligned with the NB-IoT subcarrier, interference is generated only when the two systems simultaneously use a same resource, and an interference range is not larger than an overlapping area.

It can be learned from the foregoing several interference cases that, when the network device determines the first resource and the NR system and the NB-IoT system coexist, if the NR subcarrier spacing is different from the NB-IoT subcarrier spacing, or if the NR subcarrier spacing is the same as the NB-IoT subcarrier spacing but the NR subcarrier is not aligned with the NB-IoT subcarrier, the first resource with a frequency band resource larger than a frequency band resource used by the NB-IoT system needs to be reserved, or if the NR subcarrier spacing is the same as the NB-IoT subcarrier spacing and the NR subcarrier is aligned with the NB-IoT subcarrier, the first resource with a frequency band resource exactly equal to a frequency band resource used by the NB-IoT system needs to be reserved.

A person skilled in the art may understand that a frequency band resource used for one NB-IoT carrier occupies one RB and one RB includes 12 subcarriers. Therefore, when the NR subcarrier spacing is different from the NB-IoT subcarrier spacing, or the NR subcarrier spacing is the same as the NB-IoT subcarrier spacing but the NR subcarrier is not aligned with the NB-IoT subcarrier, a quantity of subcarriers occupied by the first resource that needs to be reserved is greater than 12. When the NR subcarrier spacing is the same as the NB-IoT subcarrier spacing and the NR subcarrier is aligned with the NB-IoT subcarrier, a quantity of subcarriers occupied by the first resource that needs to be reserved may be 12.

It should be noted that when the NR subcarrier spacing is the same as the NB-IoT subcarrier spacing and the NR subcarrier is aligned with the NB-IoT subcarrier, a resource with a frequency band resource larger than the frequency band resource used by the NB-IoT system may also be reserved. This is not limited in this embodiment of the present disclosure.

The following describes in detail how to reserve the first resource in the foregoing two cases.

In a first case, the first resource with the frequency band resource exactly equal to the frequency band resource used by the NB-IoT system needs to be reserved.

In this case, in the frequency domain, the first resource with a width of a maximum of 12 subcarriers need to be reserved, to avoid the interference between the NR system and the NB-IoT system. Therefore, the first resource occupies 12 subcarriers in the frequency domain. The 12 subcarriers may be subcarriers on one RB, or may be subcarriers on two adjacent RBs.

In one embodiment, the network device needs to use the first indication information to indicate the first RB, that is, indicate an RB or RBs including the 12 subcarriers. In one embodiment, the first indication information includes index information of the first RB or bitmap information of the first RB.

Specifically, for ease of understanding, two adjacent RBs may be used as an RB pair. The first RB may be an RB with a lower frequency in the RB pair, or an RB with a higher frequency in the RB pair. In a specific implementation process, the network device and the terminal may determine, through pre-definition or pre-negotiation, whether the first RB is the RB with the lower frequency or the RB with the higher frequency, or may use 1-bit information in the first indication information to indicate whether the first RB is the RB with the lower frequency or the RB with the higher frequency. After obtaining an index of the first RB based on the first indication information, and learning whether the first RB is the RB with the lower frequency or the RB with the higher frequency, the terminal may determine the other RB in the RB pair based on the first RB. For example, if the first RB is an RB 2, and the first RB is the RB with the lower frequency, the terminal may determine that the other RB in the RB pair is an RB 3.

In one embodiment, the first indication information includes index information of the first RB. To be specific, the network device may use the index information of the first RB to indicate the first RB. It should be noted that an index of the first RB may be a cell common index, or may be an index defined for the terminal based on a bandwidth part (BWP).

In addition, after two adjacent RBs are used as an RB pair, an index of the RB pair may be an index of any RB in the two RBs.

Figure 4:
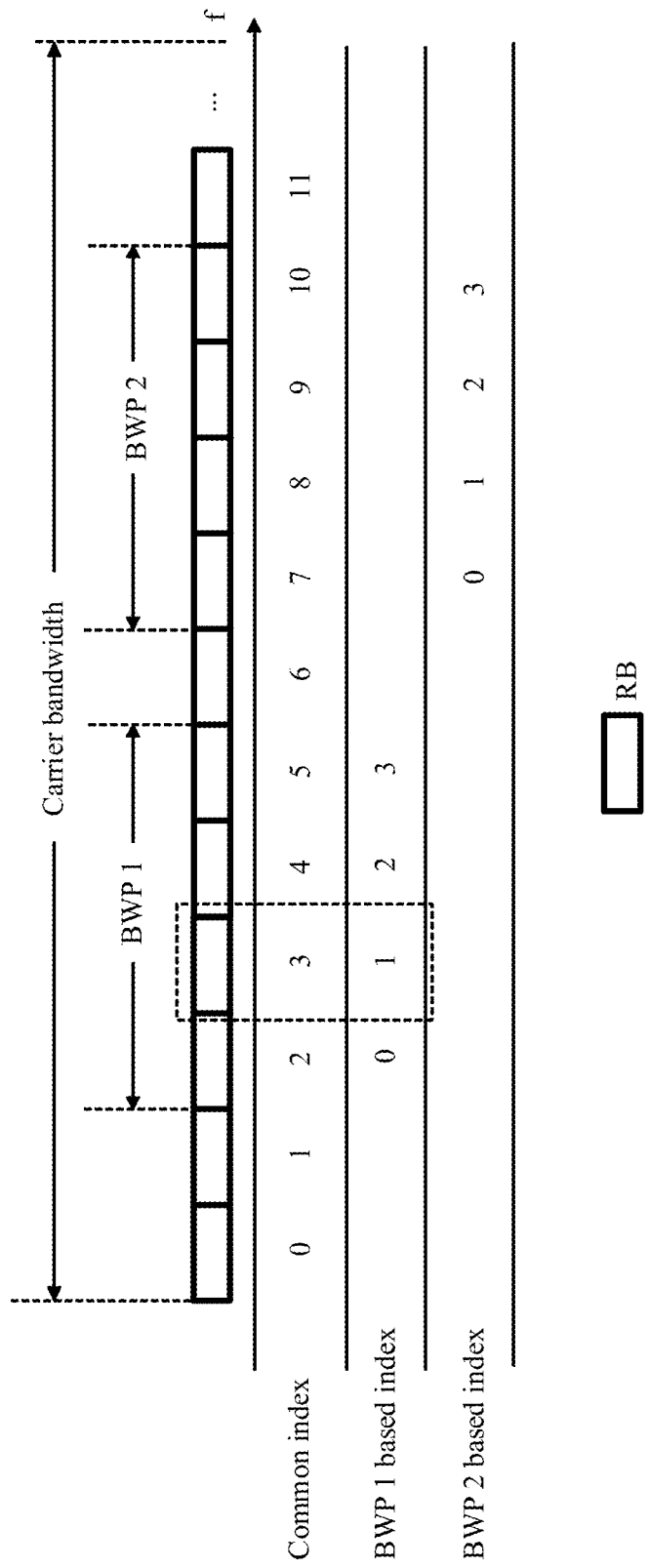
FIG. 4 is a schematic diagram of a cell common index and a BWP-based index.

For example, FIG. 4 is a schematic diagram of a cell common index and a BWP-based index. As shown in FIG. 4, an NR base station usually configures several BWPs for different terminals to perform transmission. Therefore, for a terminal, a same RB may be indicated by using a common index or may be indicated by using a BWP-based index. For an RB in a dashed-line box in FIG. 4, if a BWP 1 is configured for a terminal 1, for the terminal 1, the RB may be indicated by using a common index 3 or may be indicated by using an index 1 indicated based on the BWP 1.

In addition, if the first resource needs to be reserved on a plurality of RB pairs, the first indication information includes a plurality of pieces of index information. Still as shown in FIG. 4, assuming that a carrier bandwidth in a system includes only 12 RBs and a common index is used for indication, the first indication information includes index information {1, 4, and 9}, to indicate the $2^{nd}$, $5^{th}$, and $10^{th}$ RBs, to notify that the $2^{nd}$, $5^{th}$, and $10^{th}$ RBs are RBs on which the first resource is located.

In another embodiment, the first indication information includes bitmap information of the first RB. To be specific, the network device may use the bitmap information of the first RB to indicate the first RB. Similar to the index information, the bitmap information may be a common bitmap, or may be a BWP-based bitmap. Each binary bit in the bitmap information represents one RB, and a value of the bit represents whether the RB is an RB on which the first resource is located. For example, still as shown in FIG. 4, if common bitmap information is used to represent an RB, and an RB in a dashed-line box in FIG. 4 is an RB on which the first resource is located, the bitmap information included in the first indication information is {000100000000}. "0" indicates that a corresponding RB is not an RB corresponding to the first resource, and "1" indicates that a corresponding RB is an RB corresponding to the first resource. Certainly, "1" may alternatively be used to indicate that a corresponding RB is not an RB corresponding to the first resource, and "0" may alternatively be used to indicate that a corresponding RB is an RB corresponding to the first resource. This is not limited in this embodiment of the present disclosure. In addition, a manner for representing an RB by using a BWP-based bitmap is similar to a manner for representing an RB by using a common bitmap. Details are not described herein again.

In addition, still as shown in FIG. 4, if the $2^{nd}$, $5^{th}$, and $10^{th}$ RBs are RBs on which the first resource is located, the first indication information includes bitmap information {010010000100}, to indicate the $2^{nd}$, $5^{th}$, and $10^{th}$ RBs. "0" indicates that a corresponding RB is not an RB corresponding to the first resource, and "1" indicates that a corresponding RB is an RB corresponding to the first resource.

Further, the first indication information may include only the bitmap information of the first RB. In this case, the terminal may determine a frequency domain location of the other RB based on the bitmap information of the first RB. Alternatively, the first indication information may include bitmap information of two RBs in an RB pair. In this case, the terminal may directly determine, based on the two pieces of bitmap information, the RB pair on which the first resource is located. Alternatively, locations of the two RBs in the RB pair may be indicated by using a resource block group RBG as a granularity, and each RBG includes two contiguous RBs. The first indication information may include RBG index information or RBG bitmap information of the RB pair, to determine a frequency domain location of the RB pair.

After determining the RB or the RB pair, the terminal further needs to determine, based on the second indication information, the subcarrier occupied by the first resource on the first RB.

In one embodiment, the second indication information includes at least one of the following information: a quantity of subcarriers occupied by the first resource on the first RB; an offset between a second subcarrier of the first resource and a third subcarrier of the first RB, where the second subcarrier includes the $1^{st}$ subcarrier of the first resource, and the third subcarrier includes the $1^{st}$ subcarrier of the first RB; or identifier information of the subcarrier occupied by the first resource on the first RB.

It should be noted that in addition to occupying some subcarriers on the first RB, the first resource may occupy some subcarriers on a second RB. The first RB and the second RB are contiguous RBs, the subcarrier occupied by the first resource on the first RB and the subcarrier occupied by the first resource on the second RB are contiguous subcarriers, and a sum of the quantity of subcarriers occupied by the first resource on the first RB and a quantity of subcarriers occupied by the first resource on the second RB is 12.

Figure 5:
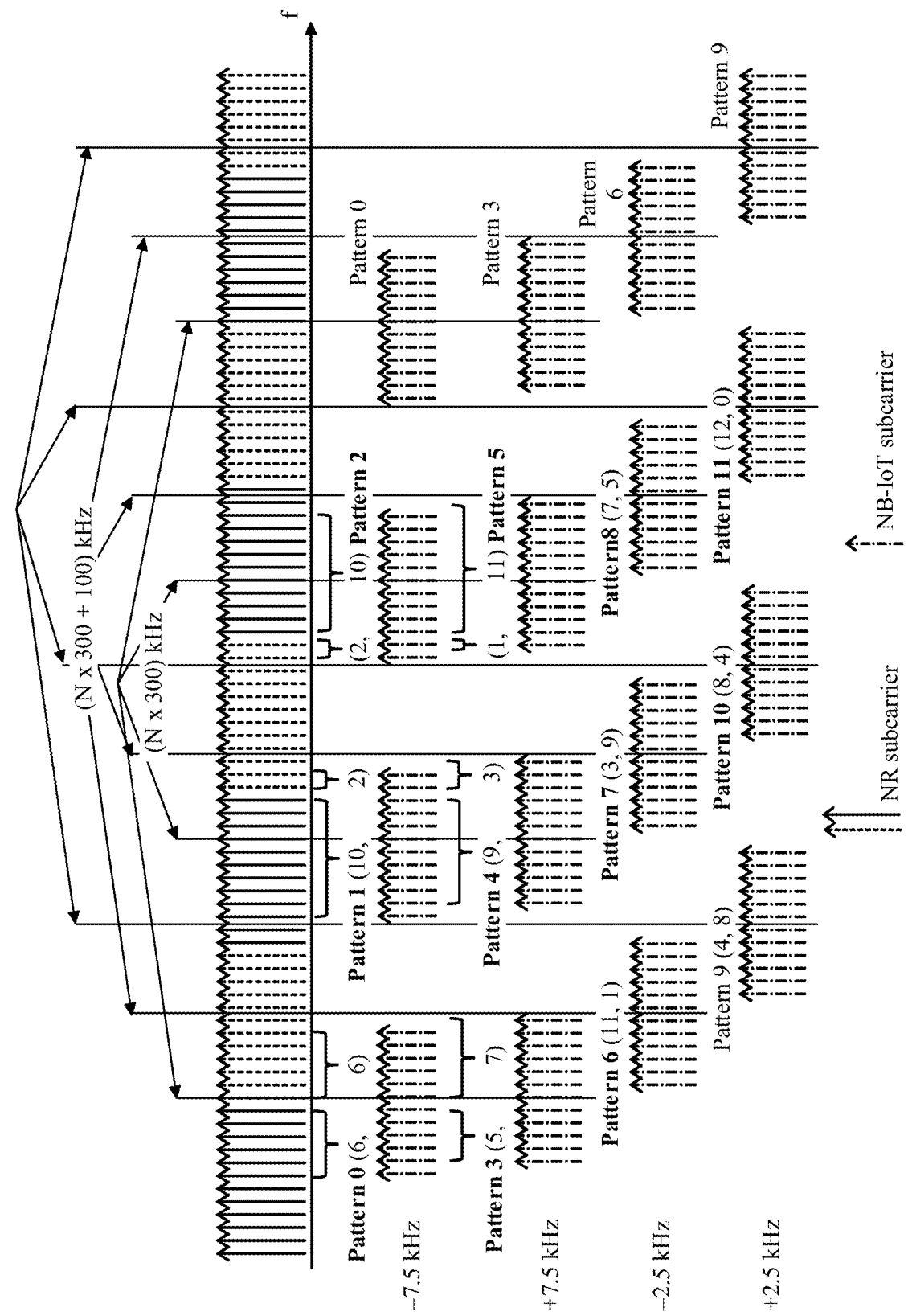
FIG. 5 is a schematic diagram of overlapping between an NB-IoT anchor carrier and an NR carrier.

Specifically, FIG. 5 is a schematic diagram of overlapping between an NB-IoT anchor carrier and an NR carrier. As shown in FIG. 5, when the NR system and an LTE system coexist by reusing the LTE frequency band, in a frequency band with a frequency lower than 2.6 GHz, an NR raster is also 100 kHz. A frequency of at least one NR subcarrier is N×100 kHz. For the NB-IoT system, a center frequency of the NB-IoT anchor carrier is "(N×100 kHz)+7.5 kHz" or "(N×100 kHz)+2.5 kHz". Considering the foregoing four cases, there are 12 cases in which an NB-IoT subcarrier is aligned with an NR subcarrier. For example, in FIG. 5, one NR carrier includes an even quantity of RBs. For NR subcarriers, 12 contiguous dashed-line arrows indicate an RB with an even number, 12 contiguous solid-line arrows indicate an RB with an odd number. A dash-dot line arrow indicates an NB-IoT subcarrier.

It should be noted that, in FIG. 5, the quantity of subcarriers occupied by the first resource on the first RB is defined in a form of an RB pair. Each case in which an NB-IoT subcarrier is aligned with an NR subcarrier is referred to as a pattern. For example, a pattern 1 (10, 2) indicates that an NB-IoT RB overlaps with an NR RB pair (two contiguous RBs), for example, overlaps with an RB 3 and an RB 4, and an overlapping area includes 10 subcarriers with larger indexes on an RB with a smaller index (for example, the RB 3) in the RB pair and two subcarriers with smaller indexes on an RB (for example, the RB 4) with a larger index. Therefore, the quantity of subcarriers occupied by the first resource on the first RB (the RB 3) is 10, the quantity of subcarriers occupied by the first resource on the second RB (the RB 4) is 2, and the subcarriers occupied by the first resource on the first RB and the subcarriers occupied by the first resource on the second RB are contiguous subcarriers. Other patterns are similar to the pattern 1. Details are not described herein again.

Particularly, for a pattern 11 in FIG. 5, an NB-IoT carrier is exactly aligned with one NR RB, and one RB, rather than two RBs, is actually affected. However, to keep a form the same as a form of another pattern, the affected RB may be determined as an RB with a smaller index in an RB pair, and the pattern is defined as (12, 0). Alternatively, the affected RB may be determined as an RB with a larger index in an RB pair, and the pattern is defined as (0, 12).

Based on the plurality of patterns in FIG. 5, when the second indication information includes the quantity of subcarriers occupied by the first resource on the first RB, a possible manner for representing the second indication information is shown in Table 1.

TABLE 1

| Indicated index | Pattern ($N_k$, $N_{k+1}$) |
| --- | --- |
| 0 | (6, 6) |
| 1 | (10, 2) |
| 2 | (2, 10) |
| 3 | (5, 7) |
| 4 | (9, 3) |
| 5 | (1, 11) |
| 6 | (11, 1) |
| 7 | (3, 9) |
| 8 | (7, 5) |
| 9 | (4, 8) |
| 10 | (8, 4) |
| 11 | (12, 0) or (0, 12) |

A pattern ($N_k$, $N_{k+1}$) in Table 1 indicates a quantity of subcarriers occupied by the first resource on an RB pair including two RBs that are contiguous in the frequency domain. Specifically, the first resource occupies "$N_k$ subcarriers with larger indexes on an RB (an $RB_k$) with a smaller index" in the RB pair, and occupies "$N_{k+1}$ subcarriers with smaller indexes on an RB (an $RB_{k+1}$) with a larger index" in the RB pair, where the $RB_k$ represents an RB whose index is k, and $N_k$ subcarriers with larger indexes on an RB represent $N_k$ subcarriers with a highest frequency in 12 subcarriers on the RB.

It should be noted that a correspondence between an indicated index and a pattern in Table 1 is merely an example, and there may be another correspondence manner, as shown in Table 2.

TABLE 2

| Indicated index | Pattern ($N_k$, $N_{k+1}$) |
|---|---|
| 0 | (12, 0) or (0, 12) |
| 1 | (11, 1) |
| 2 | (10, 2) |
| 3 | (9, 3) |
| 4 | (8, 4) |
| 5 | (7, 5) |
| 6 | (6, 6) |
| 7 | (5, 7) |
| 8 | (4, 8) |
| 9 | (3, 9) |
| 10 | (2, 10) |
| 11 | (1, 11) |

In addition, the second indication information may be alternatively represented in another manner. For example, in an RB pair, because there is a relationship "$N_k+N_{k+1}=12$" between $N_k$ and $N_{k+1}$, only a quantity of subcarriers occupied by the first resource on an $RB_k$ or an $RB_{k+1}$ may be notified. After the quantity of subcarriers occupied by the first resource on the $RB_k$ or the $RB_{k+1}$ is notified, the terminal can determine a quantity of subcarriers occupied by the first resource on the other RB in the RB pair.

For example, the second indication information may be represented in a manner shown in Table 3:

TABLE 3

| Indicated index | Pattern ($N_k$ or $N_{k+1}$) |
|---|---|
| 0 | 12 |
| 1 | 11 |
| 2 | 10 |
| 3 | 9 |
| 4 | 8 |
| 5 | 7 |
| 6 | 6 |
| 7 | 5 |
| 8 | 4 |
| 9 | 3 |
| 10 | 2 |
| 11 | 1 |

$N_k$ in Table 3 indicates that the first resource occupies $N_k$ subcarriers on the first RB (an $RB_k$). If the $RB_k$ is an RB with a lower frequency, the terminal may determine that the first resource occupies (12−$N_k$) subcarriers on the second RB (an $RB_{k+1}$). Because the $N_k$ subcarriers occupied by the first resource on the $RB_k$ and the (12−$N_k$) subcarriers occupied by the first resource on the $RB_{k+1}$ are contiguous subcarriers, the first resource occupies the $N_k$ subcarriers with larger indexes on the $RB_k$ and the (12−$N_k$) subcarriers with smaller indexes on the $RB_{k+1}$.

When the first indication information indicates that the first resource occupies $N_k$ subcarriers on the second RB (the $RB_{k+1}$), the terminal determines the quantity of subcarriers occupied by the first resource on the first RB in a manner similar to the foregoing manner. Details are not described herein again.

In addition, the second indication information may also include the offset between the second subcarrier of the first resource and the third subcarrier of the first RB. The second subcarrier may be the $1^{st}$ subcarrier of the first resource, and the third subcarrier may be the $1^{st}$ subcarrier of the first RB. Certainly, the second subcarrier may alternatively be the $6^{th}$ or the $7^{th}$ subcarrier of the first resource, and the third subcarrier may alternatively be the $6^{th}$ or the $7^{th}$ subcarrier of the first RB. In other words, when the second subcarrier is the $m^{th}$ subcarrier of the first resource, the third subcarrier is the $m^{th}$ subcarrier of the first RB. The following uses an example in which the second subcarrier is the $1^{st}$ subcarrier of the first resource and the third subcarrier is the $1^{st}$ subcarrier of the first RB for description.

The offset may be represented as a quantity of subcarriers by which the $1^{st}$ subcarrier of the first RB is shifted toward a higher frequency, or a quantity of subcarriers by which the last subcarrier of the first RB is shifted toward a lower frequency. Certainly, the offset may alternatively be represented as a quantity of subcarriers by which the $1^{st}$ subcarrier of the second RB is shifted toward a lower frequency, or a quantity of subcarriers by which the last subcarrier of the second RB is shifted toward a lower frequency.

When the second indication information includes the offset between the second subcarrier of the first resource and the third subcarrier of the first RB, a possible manner for representing the second indication information is shown in Table 4:

TABLE 4

| Indicated index | Subcarrier offset $N_k$ (or $N_{k+1}$) |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |

In Table 4, the subcarrier offset $N_k$ is represented as a quantity of subcarriers by which the 1st subcarrier of the first RB (an $RB_k$) is shifted toward a higher frequency. For example, if a value of $N_k$ is 0, it indicates that the $1^{st}$ subcarrier of the first resource is exactly aligned with the $1^{st}$ subcarrier of the first RB (the $RB_k$) and there is no subcarrier offset. For another example, if a value of $N_k$ is 4, it indicates that an offset between the $1^{st}$ subcarrier of the first resource and the $1^{st}$ subcarrier of the first RB (the $RB_k$) is 4. In other words, there may be four subcarriers by which the $1^{st}$ subcarrier of the first RB (the $RB_k$) is shifted toward a higher frequency.

Certainly, the subcarrier offset $N_k$ in Table 4 is alternatively represented as a quantity of subcarriers by which the last subcarrier of the first RB (the $RB_k$) is shifted toward a lower frequency, or a quantity of subcarriers by which the $1^{st}$ subcarrier of the second RB (an $RB_{k+1}$) is shifted toward a lower frequency.

In a possible manner, a positive subcarrier offset or a negative subcarrier offset may be further used to indicate an offset direction, and a value of the subcarrier offset indicates a quantity of subcarriers. For example, a subcarrier offset +4 indicates that the $1^{st}$ subcarrier of the first RB is aligned with the $1^{st}$ subcarrier of the first resource after the $1^{st}$ subcarrier of the first RB is shifted by four subcarriers toward a higher frequency; and a subcarrier offset −5 indicates that the $1^{st}$ subcarrier of the first RB overlaps the $1^{st}$ subcarrier of the first resource after the $1^{st}$ subcarrier of the first RB is shifted by five subcarriers toward a lower frequency.

In addition, the second indication information may alternatively include the identifier information of the subcarrier occupied by the first resource on the first RB. Specifically, the pattern or the offset is defined from a perspective of an RB pair in Table 1 to Table 4. In a specific implementation process, the pattern may also be defined from a perspective of a single RB.

When the second indication information includes the identifier information of the subcarrier occupied by the first resource on the first RB, a possible manner for representing the second indication information is shown in Table 5.

TABLE 5

| Indicated index | Reserved SC number |
| --- | --- |
| 0 | 0 |
| 1 | 0 and 1 |
| 2 | 0 to 2 |
| 3 | 0 to 3 |
| 4 | 0 to 4 |
| 5 | 0 to 5 |
| 6 | 0 to 6 |
| 7 | 0 to 7 |
| 8 | 0 to 8 |
| 9 | 0 to 9 |
| 10 | 0 to 10 |
| 11 | 0 to 11 |
| 12 | 1 to 11 |
| 13 | 2 to 11 |
| 14 | 3 to 11 |
| 15 | 4 to 11 |
| 16 | 5 to 11 |
| 17 | 6 to 11 |
| 18 | 7 to 11 |
| 19 | 8 to 11 |
| 20 | 9 to 11 |
| 21 | 10 and 11 |
| 22 | 11 |

The identifier information of the subcarrier may be an indicated index of a subcarrier in Table 5. In Table 5, one RB includes 12 subcarriers, which are denoted as an SC 0, an SC 1, . . . , and an SC 11. The "reserved SC number" indicates a subcarrier occupied by the first resource on the RB. For example, 3 to 11 indicates that the first resource occupies subcarriers corresponding to an SC 3, an SC 4, . . . , and the SC 11 on the RB.

In addition, the pattern (9, 3) in Table 1 is used as an example. If the pattern $(N_k, N_{k+1})$ "(9, 3)" for $(RB_k, RB_{k+1})$ in Table 1 is used for representing the second indication information, it indicates that the first resource occupies nine subcarriers on the $RB_k$ and three subcarriers on the $RB_{k+1}$. If a representation manner in Table 5 is used, a pattern of the $RB_k$ may be "3 to 11", and a pattern of the $RB_{k+1}$ is "0 to 2".

In this embodiment, the first indication information includes the index information of the first RB or the bitmap information of the first RB, to indicate the first RB, and the second indication information includes at least one of the quantity of subcarriers occupied by the first resource on the first RB, the offset between the second subcarrier of the first resource and the third subcarrier of the first RB, or the identifier information of the subcarrier occupied by the first resource on the first RB, to indicate the subcarrier occupied by the first resource on the first RB. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In one embodiment, subcarriers occupied by the first resource are N contiguous subcarriers including the first subcarrier, where N is 12n or 12n+1, and n is a nonnegative integer.

For example, N may be 12, 24, 36, 48, 60, 72, or 73.

Specifically, the first information includes the third indication information used to indicate the first subcarrier. The third indication information may be index information or bitmap information of the first subcarrier. An index of the first subcarrier may be a cell common index, or may be an index defined for the terminal based on a BWP. The bitmap information may be a common bitmap, or may be a BWP-based bitmap. Alternatively, the third indication information includes index information or bitmap information of an RB on which the first subcarrier is located, and index information or bitmap information of the first subcarrier on the RB. An index of the RB on which the first subcarrier is located may be a cell common index, or may be an index defined for the terminal based on a BWP. The bitmap information may be a common bitmap, or may be a BWP-based bitmap. After receiving the third indication information sent by the network device, the terminal determines the first resource based on the first subcarrier indicated in the third indication information. The subcarriers occupied by the first resource are N contiguous subcarriers including the first subcarrier.

In one embodiment, the first subcarrier may be the $1^{st}$ subcarrier of the first resource, and the third indication information may include the bitmap information or the index information of the first subcarrier. The terminal determines the first subcarrier based on the bitmap information or the index information of the first subcarrier, and uses N contiguous subcarriers starting from the first subcarrier as the subcarriers occupied by the first resource.

For example, if the third indication information includes the index information of the first subcarrier, and N is 12, assuming that the index of the first subcarrier is 3, the terminal uses subcarriers whose indexes are 3 to 14 as the subcarriers occupied by the first resource.

In addition, several NB-IoT systems may occupy resources in parallel. Therefore, N may be a multiple of 12.

Further, an eMTC/FeMTC/eFeMTC system is also a machine type communications system. A primary synchronization signal, a secondary synchronization signal, and a physical broadcast channel (PBCH) that are used by the eMTC/FeMTC/eFeMTC system occupy a width of 73 subcarriers (SCS=15 kHz). When the NR system reserves a resource for the system, a value of N may alternatively be 73.

It should be noted that a specific value of N may vary depending on an actual situation. The specific value of N is not limited in this embodiment.

In one embodiment, the third indication information is further used to indicate the first subcarrier and a quantity of contiguous subcarriers occupied by the first resource, and the quantity of contiguous subcarriers occupied by the first resource is 12, 24, 36, 48, 60, 72, or 73.

Specifically, the third indication information indicates the first subcarrier and the quantity N of contiguous subcarriers occupied by the first resource. After receiving the third indication information sent by the network device, the terminal determines the first resource based on the first subcarrier and the quantity N of contiguous subcarriers that are indicated in the third indication information. The subcarriers occupied by the first resource are N contiguous subcarriers including the first subcarrier.

In one embodiment, the third indication information indicates a resource indication value (RIV), and an RIV value has a mapping relationship with a resource determined based on the N contiguous subcarriers starting from the first subcarrier. When the RIV has a different value, the $1^{st}$ subcarrier and/or the quantity N of contiguous subcarriers of the resource corresponding to the RIV are/is different.

A possible mapping relationship between the RIV, the first subcarrier, and the quantity of contiguous subcarriers is as follows:

If $(N-1) \leq \lfloor L/2 \rfloor$,
RIV=L(N−1)+K;
or
RIV=L(L−N+1)+(L−1−K).

K is an index of the first subcarrier, L is a total quantity of subcarriers, and N is the quantity of contiguous subcarriers. The index of the first subcarrier and the total quantity of subcarriers may be a cell common subcarrier index and a cell common total quantity of subcarriers, or may be a subcarrier index and a total quantity of subcarriers that are defined for the terminal based on a BWP. For a resource reserved for the NB-IoT system, a value of N may be 12, 24, 36, 48, 60, 72, or 73. The third indication information may be the RIV value, or may be an intermediate indication value having a one-to-one correspondence with the RIV. After receiving the third indication information sent by the network device, the terminal determines the first resource based on the RIV indicated in the third indication information. Subcarriers occupied by the first resource are N contiguous subcarriers starting from the first subcarrier.

In another possible manner, the third indication information includes index information or bitmap information of the first subcarrier and subcarrier quantity indication information. The subcarrier quantity indication information indicates a quantity N of contiguous subcarriers, and a value of N may be 12, 24, 36, 48, 60, 72, or 73. The subcarrier quantity indication information may be the quantity value N of contiguous subcarriers, or the subcarrier quantity indication information may be an intermediate indication value having a one-to-one correspondence with the quantity N of contiguous subcarriers. For example, the subcarrier quantity indication information may be one piece of M-bit information. The M-bit information includes $2^M$ states, and seven states in the $2^M$ states have a one-to-one correspondence with 12, 24, 36, 48, 70, 72, and 73, where M is greater than or equal to 3. After receiving the third indication information sent by the network device, the terminal determines the first subcarrier based on the index information or the bitmap information of the first subcarrier, determines the quantity N of subcarriers based on the subcarrier quantity indication information, and uses the N contiguous subcarriers starting from the first subcarrier as subcarriers occupied by the first resource. In this case, if the third indication information does not include the contiguous-subcarrier quantity indication information, the terminal may use a predefined default quantity N of subcarriers as the reserved resource. For example, the predefined N is 12.

In this embodiment, the third indication information is used to indicate the first subcarrier, and the first subcarrier is used to determine the first resource. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

In a second case, the first resource with the frequency band resource larger than the frequency band resource used by the NB-IoT system needs to be reserved.

In this case, the first resource with the frequency band resource larger than the frequency band resource used by the NB-IoT system needs to be reserved in the frequency domain. In other words, a quantity of subcarriers reserved as and occupied by the first resource is greater than 12. In actual application, when the first resource is to be reserved, an RB-level resource may be reserved, or a subcarrier-level resource may be reserved.

Figure 6A:
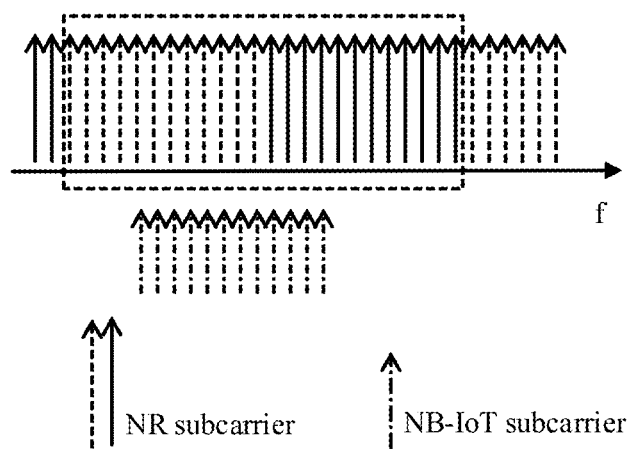
FIG. 6a is a schematic diagram of reservation of an RB-level resource.
Figure 6B:
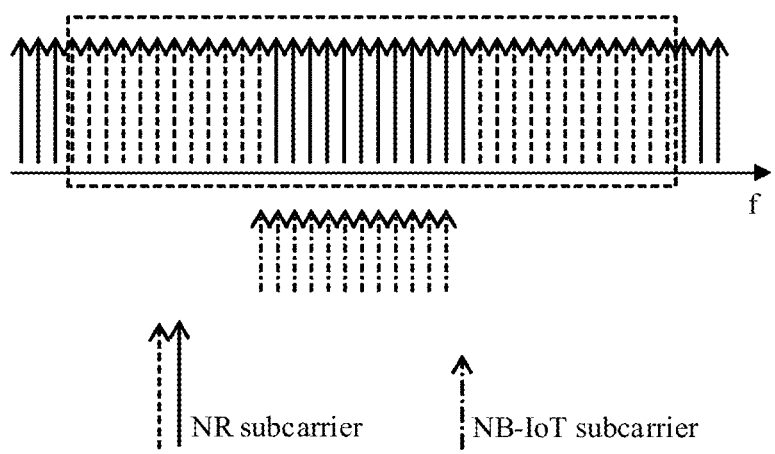
FIG. 6b is another schematic diagram of reservation of an RB-level resource.

Specifically, to avoid the mutual interference between the NR system and the NB-IoT system, the network device may use the first indication information to indicate a plurality of RBs, and the terminal uses all the RBs as the reserved resource based on the RBs indicated in the first indication information. In this case, the resource is reserved by using an RB as a granularity. For example, FIG. 6a is a schematic diagram of reservation of an RB-level resource, and FIG. 6b is another schematic diagram of reservation of an RB-level resource. As shown in FIG. 6a and FIG. 6b, a dashed-line box indicates the first resource that is notified by the network device to the terminal and that needs to be reserved. A quantity of reserved RBs in FIG. 6a is 2, and a quantity of reserved RBs in FIG. 6b is 3. Certainly, a quantity of reserved RBs may also be determined based on interference or an actual situation. A specific quantity of reserved RBs is not limited in this embodiment.

When the RB-level resource is to be reserved, the network device only needs to add the first indication information to the first information, to indicate an RB that needs to be reserved, and does not need to use an additional bit to indicate a subcarrier occupied by the first resource on the reserved RB. Therefore, signaling overheads can be reduced.

In addition, when the subcarrier-level resource is to be reserved, because the quantity of subcarriers occupied by the first resource may be greater than 12, a quantity of RBs on which the first resource is located may be greater than or equal to 3. In this case, not only the first RB and the subcarrier occupied by the first resource on the first RB need to be indicated, but also another RB and subcarriers occupied by the first resource on the RB need to be indicated. In one embodiment, the first indication information is further used to indicate a third RB, and the second indication information is further used to indicate a subcarrier occupied by the first resource on the third RB. Subcarriers occupied by the first resource are contiguous subcarriers from the subcarrier occupied by the first resource on the first RB to the subcarrier occupied by the first resource on the third RB.

Specifically, when the subcarrier-level resource is to be reserved, index information of the first RB or bitmap information of the first RB included in the first indication information still needs to be used to indicate the first RB, and whether the first RB is a lower-frequency RB or a higher-frequency RB needs to be indicated in a manner of pre-negotiation or indicated in the first indication information. A manner for using the index information or the bitmap information to indicate the first RB is similar to a manner for indicating the first RB described in the foregoing embodiment. Details are not described herein again.

In addition, the network device further needs to use the first indication information to indicate the third RB. For example, if the first RB indicated in the first indication information is an RB 3, and the third RB indicated in the first indication information is an RB 5, the terminal may determine that RBs on which the first resource is located are the RB 3, an RB 4, and the RB 5.

When using the second indication information to indicate the subcarrier occupied by the first resource on the first RB, the network device also uses the second indication information to indicate the subcarrier occupied by the first resource on the third RB. In other words, the network device needs to notify the terminal of a subcarrier occupied by the first resource on an RB with a smallest index value and a subcarrier occupied by the first resource on an RB with a largest index value. In this case, the subcarriers occupied by the first resource are contiguous subcarriers from the subcarrier occupied by the first resource on the first RB to the subcarrier occupied by the first resource on the third RB. It should be noted that the subcarriers occupied by the first resource include the subcarrier occupied the first resource on the first RB and the subcarrier occupied the first resource on the third RB.

It should be noted that a manner in which the network device uses the first indication information to indicate the third RB is similar to the manner in which the network device uses the first indication information to indicate the first RB. In other words, the network device may also use bitmap information and index information to indicate the third RB. A manner for using the second indication information to indicate the subcarrier occupied by the first resource on the first RB is similar to a manner for using the second indication information to indicate the subcarrier occupied by the first resource on the third RB. In other words, a manner shown in Table 1 to Table 5 may also be used to indicate the subcarrier occupied by the first resource on the third RB. Details are not described herein again.

Figure 7A:
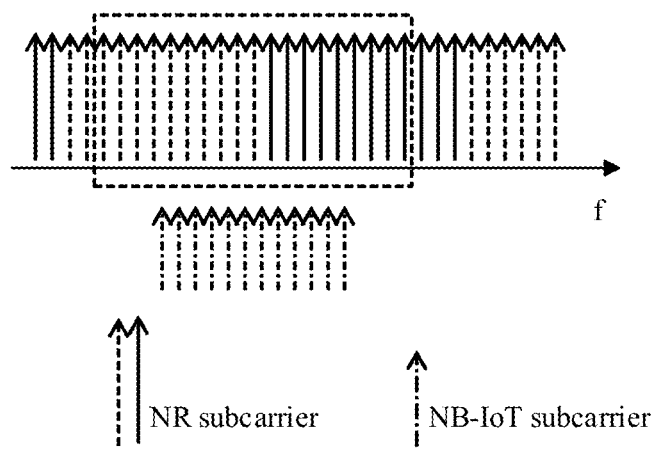
FIG. 7a is a schematic diagram of reservation of a subcarrier-level resource.
Figure 7B:
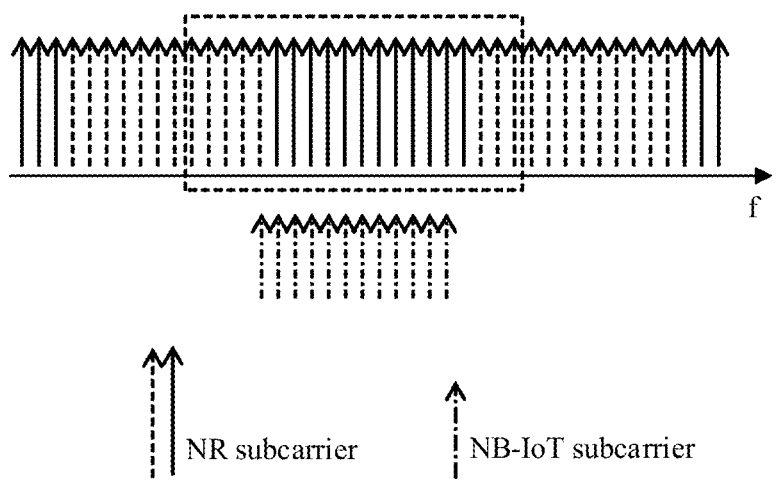
FIG. 7b is another schematic diagram of reservation of a subcarrier-level resource.

For example, FIG. 7a is a schematic diagram of reservation of a subcarrier-level resource, and FIG. 7b is another schematic diagram of reservation of a subcarrier-level resource. As shown in FIG. 7a and FIG. 7b, the second indication information herein is represented in a manner shown in Table 5. To be specific, a single RB is indicated. For two RBs (an $RB_k$ and an $RB_{k+1}$) in FIG. 7a, the first indication information may be used to separately indicate the first RB (the $RB_k$) and the third RB (the $RB_{k+1}$), and the second indication information may be used to separately indicate the subcarrier occupied by the first resource on the first RB (the $RB_k$) and the subcarrier occupied by the first resource on the third RB (the $RB_{k+1}$). For example, subcarriers "2 to 11" on the $RB_k$ are occupied, and subcarriers "0 to 8" on the $RB_{k+1}$ are occupied. For three RBs (an $RB_{k-1}$, an $RB_k$, and an $RB_{k+1}$) in FIG. 7b, the first indication information may be used to separately indicate the first RB (the $RB_{k-1}$) and the third RB (the $RB_{k+1}$), and the second indication information may be used to separately indicate the subcarrier occupied by the first resource on the first RB (the $RB_{k-1}$) and the subcarrier occupied by the first resource on the third RB (the $RB_{k+1}$). For example, subcarriers "7 to 11" on the $RB_{k-1}$ are occupied, and subcarriers "0 to 2" on the $RB_{k+1}$ are occupied. In this case, subcarriers occupied on the $RB_k$ are subcarriers "0 to 11" by default. Certainly, the network device may alternatively indicate, in the second indication information, that all subcarriers on each RB from the first RB to the third RB are reserved.

It should be noted that, in the foregoing two cases for reserving the first resource, when the network device uses the first indication information to indicate the first RB, and uses the second indication information to indicate the subcarrier occupied by the first resource on the first RB, each RB may correspond to one subcarrier indication pattern. In other words, each RB may be separately indicated, and a subcarrier occupied by the first resource on the RB may be indicated in any manner shown in Table 1 to Table 5; or for a plurality of RBs, a same manner may be used to indicate subcarriers occupied by the first resource on the RBs.

In one embodiment, when sending the first information to the terminal, the network device may add the first information to system information and/or user-specific higher layer signaling for sending.

Specifically, a system information may be, for example, remaining minimum system information (RMSI) or other system information (OSI). When the first information is sent by using the system information, the system information may be sent in a broadcast manner. In this way, all terminals in an NR cell may learn of, based on the first indication information and the second indication information in the system information, the first resource that needs to be reserved. When the terminal is notified by using the system information, the first indication information may include cell common index information or cell common bitmap information.

In addition, the first information may also be added to the user-specific higher layer signaling that is oriented and specific to different UEs/UE groups, for example, radio resource control (RRC) signaling. The user-specific higher layer signaling is separately configured for the different UEs or UE groups. When the terminal is notified by using the user-specific higher layer signaling, the first indication information may include cell common index information or cell common bitmap information, or may include index information or bitmap information corresponding to a BWP configured for UE/a UE group.

Further, the first resource may be notified by using a combination of the foregoing two methods. For example, some common reserved resources may be notified by using RMSI or OSI, where an RB on which the common reserved resources are located may be indicated by using cell common index information or cell common bitmap information of the RB; and other reserved resources are notified to different UEs/UE groups, where the notified reserved resources are configured for the UEs/UE groups on several BWPs, and an RB on which the reserved resources are located may be indicated by using index information or bitmap information corresponding to the BWPs.

Figure 8:
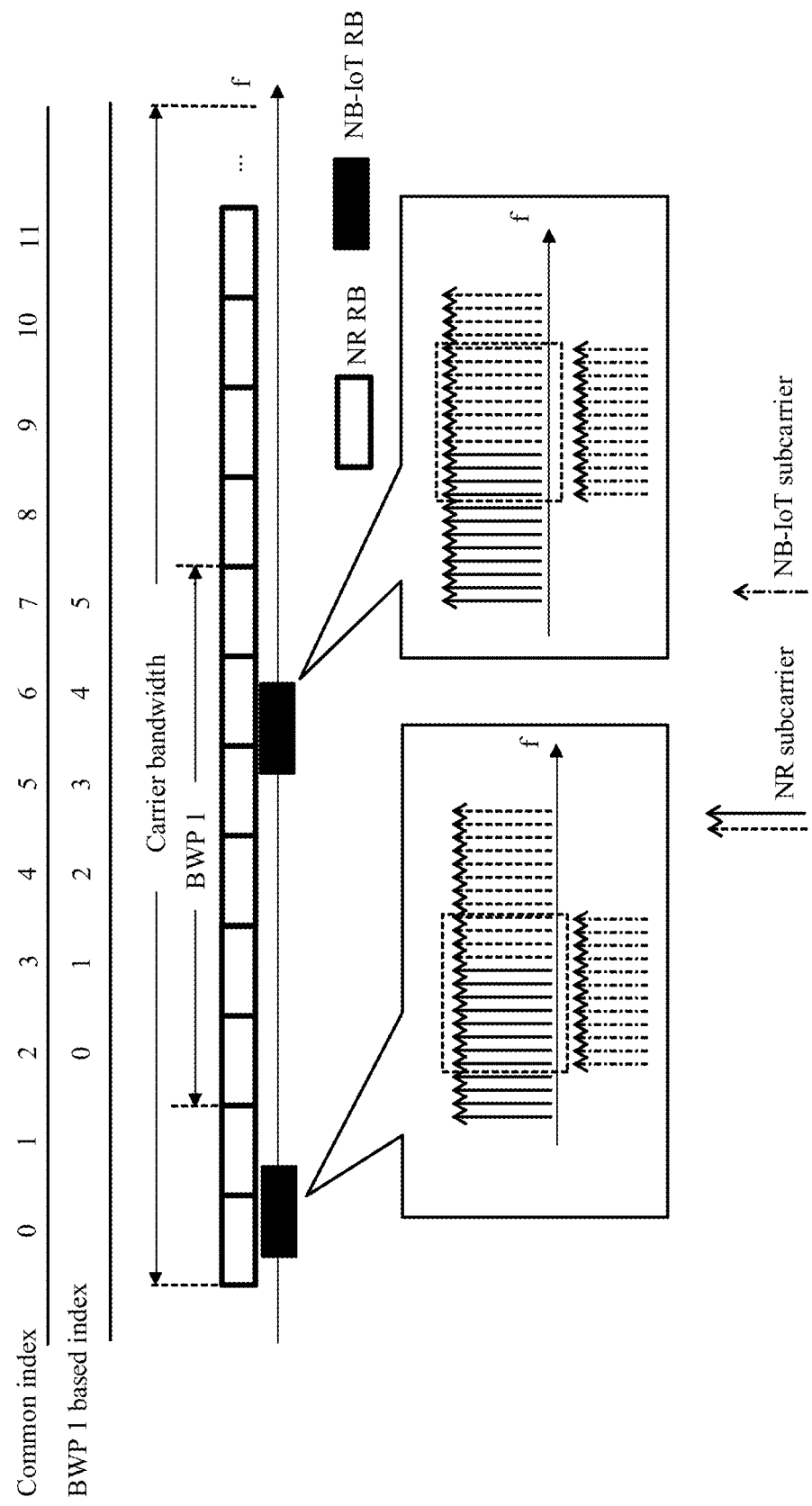
FIG. 8 is another schematic diagram of a cell common index and a BWP-based index.

For example, FIG. 8 is another schematic diagram of a cell common index and a BWP-based index. As shown in FIG. 8, the first resource needs to be reserved for the NB-IoT system on two parts of an NR system bandwidth, and a BWP 1 is configured for a terminal 1. When notifying the terminal by using the system information, the network device may use common index information to indicate the first RB, use the second indication information to indicate the subcarrier occupied by the first resource on the first RB, and add the common index information and the second indication information to the system information to notify the terminal. For example, the system information includes: a pattern 1 "(8, 4)", where index information corresponding to the first RB is an index 1 "0", and a pattern 2 "(4, 8)", where index information corresponding to the first RB is an index 2 "5". The first RB represents an RB with a lower frequency in an RB pair.

When notifying the terminal by using the user-specific higher layer signaling, the network device may determine the first resource by using BWP bitmap information and an offset between a subcarrier of the first resource and a subcarrier of the first RB. For example, the network device may notify the terminal by using UE-specific RRC signaling, where the RRC includes an offset 8, and corresponding bitmap information of the first RB is a bitmap 1 "{000100}".

It should be noted that the foregoing description is merely an example. In actual application, the manner for using the second indication information to indicate the subcarrier occupied by the first resource on the first RB may be any manner shown in Table 1 to Table 5.

It should be noted that, based on the foregoing definitions from perspectives of all frequency domain dimensions, similarly, the network device may further notify the terminal of index information or bitmap information at a slot level in time domain, to indicate a slot in which the first resource is located in a specific period.

In this embodiment, when the first resource with the frequency band resource larger than the frequency band resource used by the NB-IoT system needs to be reserved, the first indication information may also be used to indicate the third RB, the second indication information may also be used to indicate the subcarrier occupied by the first resource on the third RB, and the subcarriers occupied by the first resource are the contiguous subcarriers from the subcarrier occupied by the first resource on the first RB to the subcarrier occupied by the first resource on the third RB. This not only can improve flexibility of deployment of an NB-IoT anchor carrier, but also can avoid a time-frequency resource waste caused due to reservation of a subcarrier-level resource, and improve resource utilization in a scenario in which the NR system and the NB-IoT system coexist.

Further, the first information includes fourth indication information and fifth indication information. The fourth indication information is used to indicate a subcarrier on which a resource element (RE) is located, and the fifth indication information is used to indicate a symbol in which the RE is located. The first resource is an RE determined by the terminal based on the first indication information, the second indication information, the fourth indication information, and the fifth indication information; or the first resource is an RE determined by the terminal based on the third indication information, the fourth indication information, and the fifth indication information.

Specifically, in the NB-IoT system, several narrowband reference signals (NRS) exist in a downlink subframe. Even if the NB-IoT system includes no NB-IoT terminal for data transmission, the system sends an NRS on some REs on an RB, so that an NB-IoT terminal can perform channel estimation by using the NRS. Therefore, in the NB-IoT system, the NRS is definitely transmitted.

Figure 9A:
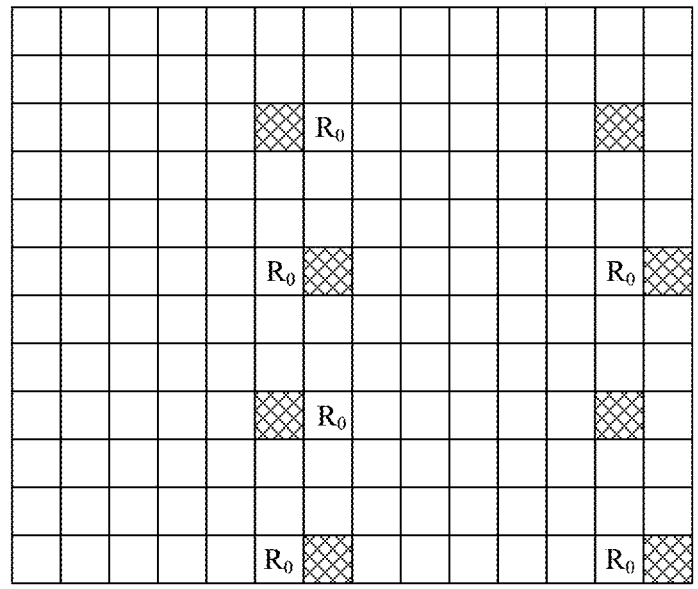
FIG. 9a is a schematic diagram of an NRS frequency offset.
Figure 9B:
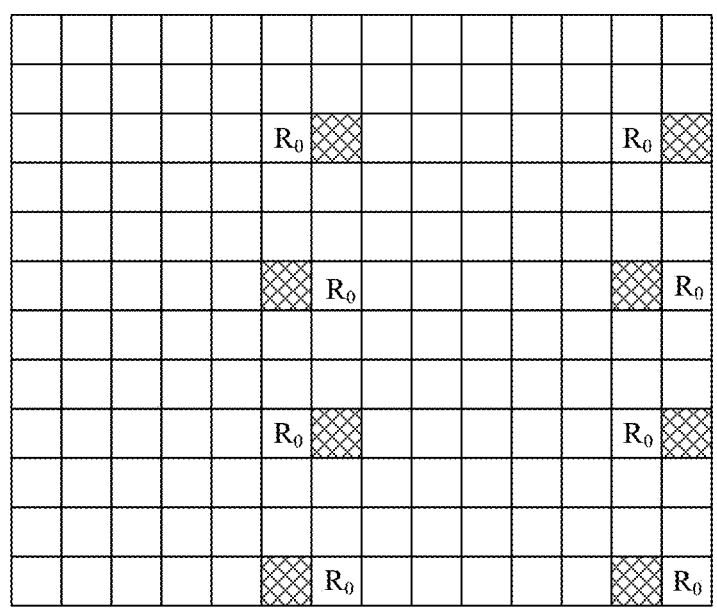
FIG. 9b is another schematic diagram of an NRS frequency offset.

FIG. 9a is a schematic diagram of an NRS frequency offset, and FIG. 9b is another schematic diagram of an NRS frequency offset. As shown in FIG. 9a and FIG. 9b, a horizontal coordinate represents a time domain, and a vertical coordinate represents a frequency domain. An RE marked with $R_0$ represents an RE occupied by an NRS sent through a port port 0, and an RE marked with $R_1$ represents an RE occupied for a port 1. When the NB-IoT system includes one port, only the RE marked with $R_0$ is used to transmit the NRS. When the NB-IoT system includes two ports, the REs marked with $R_0$ and $R_1$ are both used to transmit the NRS. In addition, in a range of one RB, the NRS may have a frequency offset, and of a quantity of shifted subcarriers is $V_{shift}=N_{ID}^{Ncell}$ mod 6, where N cell is a cell ID. For example, if the cell ID is 3, the offset is 3, and three subcarriers are shifted. If the cell ID is 8, the offset is 2, and two subcarriers are shifted.

When an NR network device schedules the NR terminal to receive downlink transmission, if the NR network device can determine that no data is transmitted on an NB-IoT carrier, the NR network device may schedule the NR terminal to transmit data on the NB-IoT carrier. In this case, only an RE on which an NRS is located needs to be skipped.

Therefore, the network device may predefine several REs, and the REs are REs used to transmit an NRS in the NB-IoT system. When being sent to the terminal device, the first information may further include the fourth indication information and the fifth indication information. The fourth indication information is used to indicate the subcarrier on which the predefined RE is located, and the fifth indication information is used to indicate the symbol in which the RE is located. After receiving the first information sent by the network device, the terminal determines, based on the first indication information and the second indication information, a resource occupied by an entire RB of an NB-IoT carrier, and then determines several REs based on the fourth indication information and the fifth indication information; or after receiving the first information sent by the network device, the terminal determines, based on the third indication information, a resource occupied by an entire RB of an NB-IoT carrier, and then determines several REs based on the fourth indication information and the fifth indication information. In this case, the first resource is the REs determined by the terminal.

In one embodiment, the fourth indication information includes index information or bitmap information of the subcarrier on which the RE is located.

In one embodiment, the fifth indication information includes index information of the symbol in one slot or bitmap information of the symbol in one slot.

Specifically, when there are a plurality of REs, a plurality of pieces of index information or a plurality of pieces of bitmap information may be used to indicate the plurality of REs. In addition, several fixed RE patterns may be defined from perspectives of a time domain dimension and a frequency domain dimension, and a specific used pattern is notified to the terminal. For an NRS, there are two different patterns based on a quantity of ports. Therefore, two patterns may be defined. When determining the first resource, the NR terminal is instructed to use the patterns and a subcarrier-level offset.

Figure 10A:
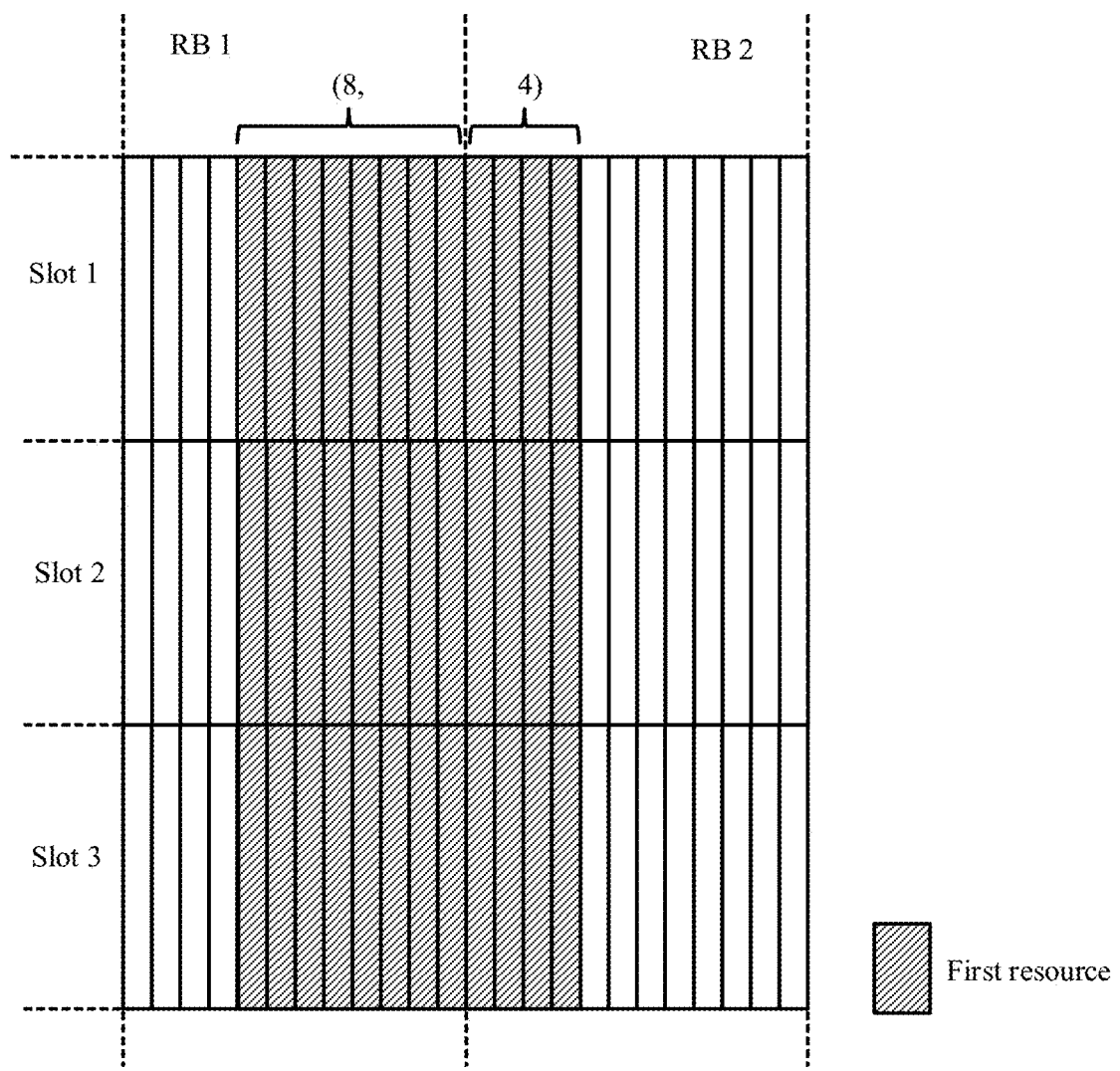
FIG. 10a is a schematic diagram of a first resource.
Figure 10B:
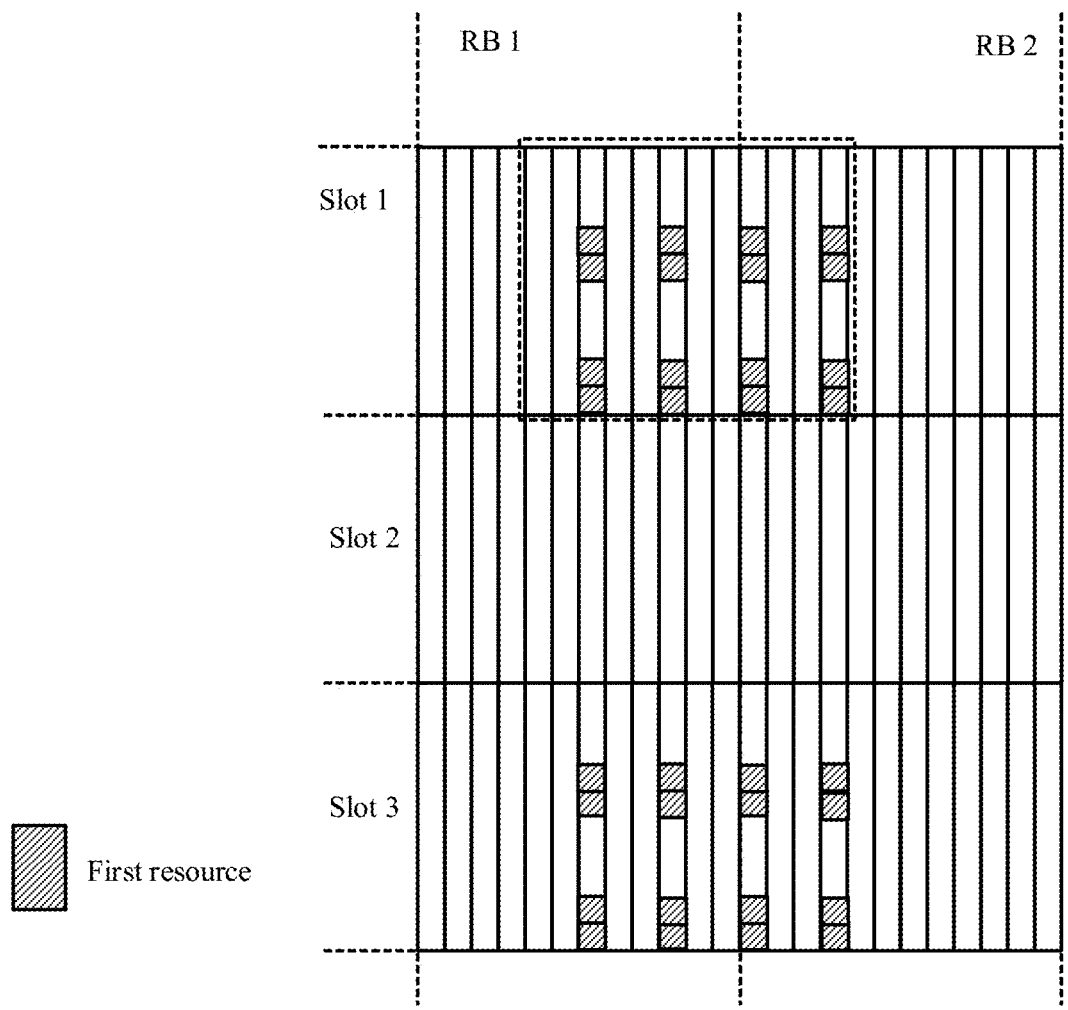
FIG. 10b is another schematic diagram of a first resource.

For example, FIG. 10a is a schematic diagram of a first resource, and FIG. 10b is another schematic diagram of a first resource. As shown in FIG. 10a, after receiving the first information sent by the network device, the terminal determines, based on the first indication information and the second indication information in the first information or based on the third indication information in the first information, that the first resource is the resource occupied by the entire RB of the NB-IoT carrier, that is, a resource shown in a shadow region in FIG. 10a. If the first information further includes the fourth indication information and the fifth indication information, the fourth indication information includes the bitmap information of the subcarrier on which the RE is located, where the bitmap information is {001001001001}, and the fifth indication information includes the bitmap information of the symbol in one slot, where the bitmap information is {00000110000011}, the terminal may determine the RE that finally needs to be reserved.

In addition, when the fourth indication information includes the index information of the subcarrier on which the RE is located, and the fifth indication information includes the index information of the symbol in one slot, a manner in which the terminal determines the RE that finally needs to be reserved is similar to the foregoing manner. Details are not described herein again.

In addition, as shown in FIG. 10*b*, the network device may further determine, based on one piece of slot-level bitmap information, specific slots in one period in which resources do not need to be reserved. For example, {101} is used to indicate that all resources in a slot 2 do not need to be reserved.

It should be noted that the finally reserved RE is determined based on the fourth indication information and the fifth indication information, and only in the scenario in which the NR subcarrier spacing is the same as the NB-IoT subcarrier spacing and the NR subcarrier is aligned with the NB-IoT subcarrier, it can be ensured that an RE reserved by the NR terminal is exactly the RE on which the NRS is located, and that a subcarrier near the RE does not cause inter-carrier interference to the RE on which the NRS is located.

In this embodiment, the network device may use the fourth indication information to indicate the subcarrier on which the RE is located, and use the fifth indication information to indicate the symbol in which the RE is located. In this case, the terminal may determine the RE based on the first indication information, the second indication information, the fourth indication information, and the fifth indication information, or determine the RE based on the third indication information, the fourth indication information, and the fifth indication information. In this way, when no downlink data is transmitted on the NB-IoT carrier, the NR terminal can use a resource on the NB-IoT carrier other than a resource reserved for the NRS. This can further improve spectral efficiency, and avoid a spectrum resource waste.

Further, the first information includes sixth indication information. The sixth indication information is used to indicate all or some symbols in a first time period. The first resource is a resource determined by the terminal based on the first indication information, the second indication information, and the sixth indication information; or the first resource is a resource determined by the terminal based on the third indication information and the sixth indication information.

In another embodiment, the first information further includes seventh indication information. The sixth indication information is used to indicate all or some symbols in the first time period, and the seventh indication information is used to indicate all or some first time units in a second time period. The first resource is a resource determined by the terminal based on the first indication information, the second indication information, the sixth indication information, and the seventh indication information; or the first resource is a resource determined by the terminal based on the third indication information, the sixth indication information, and the seventh indication information; or the first resource is a resource determined by the terminal based on the first indication information, the second indication information, and the seventh indication information; or the first resource is a resource determined by the terminal based on the third indication information and the seventh indication information.

In the NB-IoT system, when the NB-IoT system operates in an inband mode, for a narrowband primary synchronization signal (NPSS), a narrowband secondary synchronization signal (NSSS), and a narrowband physical broadcast channel (NPBCH), only the last 11 symbols in 14 symbols in one subframe are used, and the first three symbols in the subframe are not used. A quantity of symbols used for a narrowband physical downlink shared channel (NPDSCH) is configured by using higher layer indication information. In the 14 symbols in the subframe, the first one symbol, the first two symbols, or the first three symbols may not be used for the NPDSCH, in other words, only the last 13, 12, or 11 symbols are used for the NPDSCH. When the NB-IoT system operates in a guardband mode, the last 11 symbols in 14 symbols in one subframe are still used for an NPSS, an NSSS, and an NPBCH, and all 14 symbols in the subframe are used for an NPDSCH.

Therefore, when the NR system reserves a resource for the NB-IoT system, the last 11, 12, or 13 symbols or all the symbols in the subframe may be reserved in the time domain. Therefore, the NR system may use the sixth indication information to indicate a time domain symbol in which the reserved resource is located, or the NR system may use the sixth indication information and the seventh indication information to indicate a time domain symbol in which the reserved resource is located. In this way, after receiving the first information, the terminal may determine, based on the first indication information and the second indication information, a carrier on which the reserved resource is located, or determine, based on the third indication information, a carrier on which the reserved resource is located. Further, the terminal may determine, based on the sixth indication information, a symbol in which the reserved resource is located, or determine, based on the seventh indication information, a symbol in which the reserved resource is located, or determine, based on the sixth indication information and the seventh indication information, a symbol in which the reserved resource is located, to determine the reserved resource.

In one embodiment, the sixth indication information includes index information of a symbol occupied by the reserved resource in one slot or two slots, bitmap information of a symbol occupied by the reserved resource in one slot or two slots, or a start symbol of a symbol occupied by the reserved resource in one slot.

In one embodiment, the seventh indication information includes index information of one slot or two slots in a specified period, or the seventh indication information includes bitmap information of one slot or two slots in a specified period. The specified period is longer than or equal to one slot, or is longer than or equal to two slots.

Specifically, the first resource may be indicated by using a combination of a plurality of pieces of bitmap information or a plurality of pieces of index information.

Figure 11A:
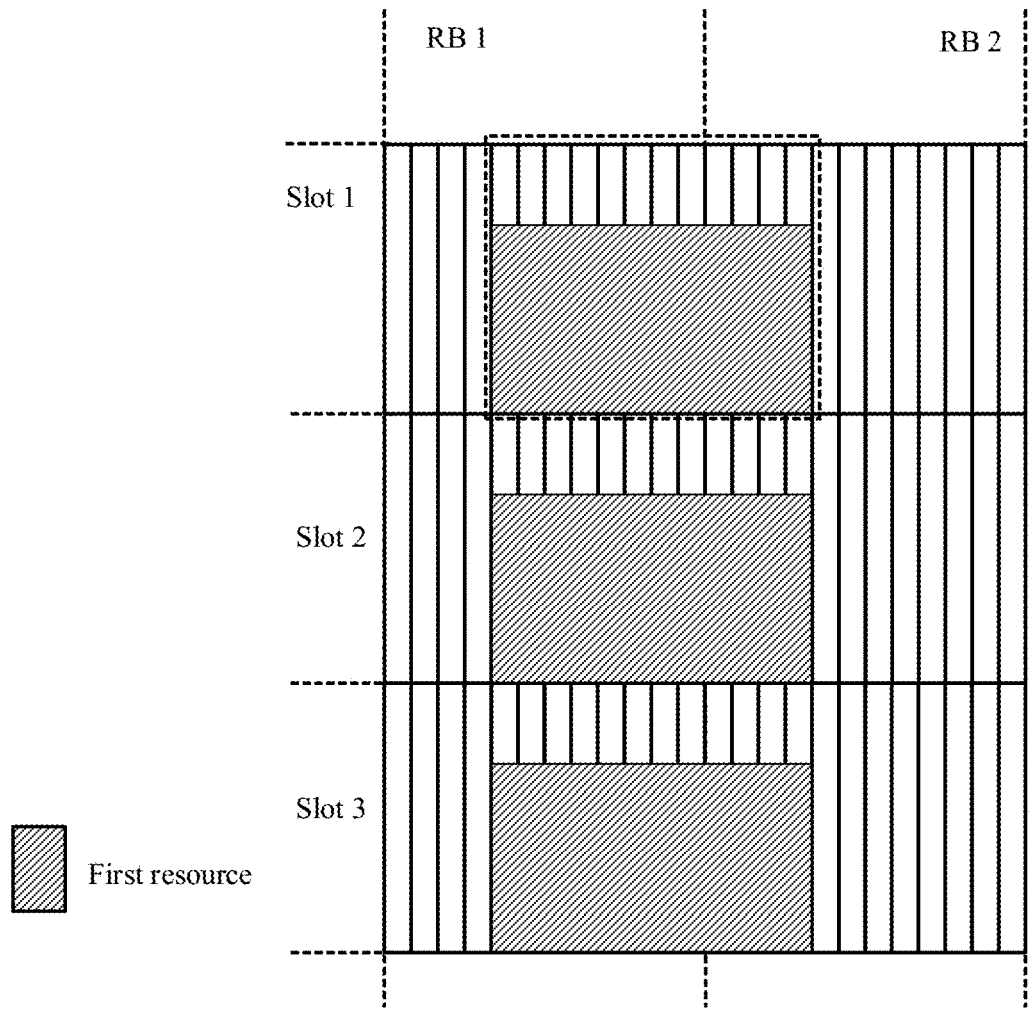
FIG. 11a is a schematic diagram of a first resource.

For example, FIG. 11*a* is a schematic diagram of a first resource. As shown in FIG. 11*a*, after receiving the first information sent by the network device, the terminal determines, based on the first indication information and the second indication information in the first information or based on the third indication information in the first information, that the first resource is a subcarrier occupied by the entire RB of the NB-IoT carrier. The terminal further determines, based on the sixth indication information in the first information, a symbol occupied by the first resource in one slot. If the sixth indication information is bitmap information of the symbol occupied by the first resource in one slot, where the sixth indication information is {00011111111111}, indicating that the last 11 symbols in the slot are symbols in which the first resource is located, the terminal may determine that the first resource is a resource shown in a shadow region in FIG. 11*a*.

Particularly, if the sixth indication information indicates "a start symbol of the symbol occupied by the reserved resource in one slot", for example, indicates index information of the start symbol, the terminal may determine that the symbol occupied by the first resource in the slot includes all symbols from the start symbol to an end symbol in the slot.

Figure 11B:
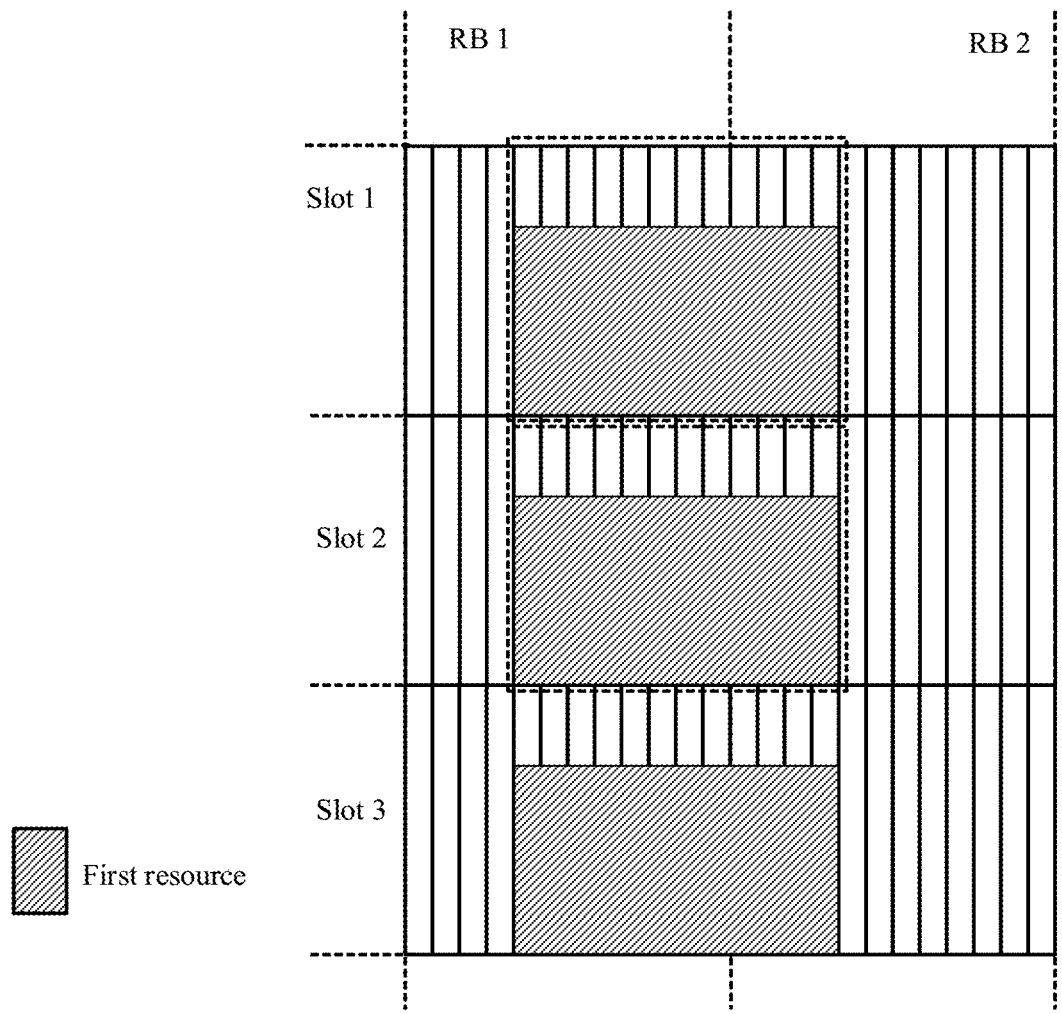
FIG. 11b is still another schematic diagram of a first resource.

For example, FIG. 11b is still another schematic diagram of a first resource. As shown in FIG. 11b, after receiving the first information sent by the network device, the terminal determines, based on the first indication information and the second indication information in the first information or based on the third indication information in the first information, that the first resource is a subcarrier occupied by the entire RB of the NB-IoT carrier. The terminal further determines, based on two pieces of sixth indication information and two pieces of seventh indication information in the first information, symbols occupied by the first resource in a plurality of slots. The sixth indication information is bitmap information of a symbol occupied by the first resource in one slot, and the seventh indication information is bitmap information of symbols occupied by the first resource in three slots. Specifically, bitmap information corresponding to one piece of sixth indication information is {000111111111111}, indicating that the last 11 symbols in one slot are symbols in which the first resource is located, and bitmap information corresponding to one piece of seventh indication information is {101}, indicating that the symbols determined based on the sixth indication information in the slot are used to determine the first resource in a slot 1 and a slot 3. Bitmap information corresponding to the other piece of sixth indication information is {011111111111111}, and bitmap information corresponding to the other piece of seventh indication information is {010}. The terminal determines, based on a plurality of pieces of sixth indication information and a plurality of pieces of seventh indication information, that the first resource is a resource shown in a shadow region in FIG. 11b.

According to the resource configuration method provided in this embodiment of the present disclosure, the network device sends the first information to the terminal. The first information is used by the terminal to determine not to send data and/or receive data on the first resource. The first information includes the first indication information used to indicate the first RB and the second indication information used to indicate the subcarrier occupied by the first resource on the first RB; or the first information includes the third indication information used to indicate the first subcarrier, and the first subcarrier is used to determine the first resource. The network device sends, to the terminal, the first information including the first indication information used to indicate the first RB and the second indication information used to indicate the subcarrier occupied by the first resource on the first RB, or including the third indication information used to indicate the first subcarrier. In this case, the terminal may determine the first resource based on the first indication information and the second indication information, or determine the first resource based on the first subcarrier indicated in the third indication information, and the terminal skips receiving and/or sending data on the determined first resource. This effectively avoids the interference between the NR system and the NB-IoT system, and can improve resource configuration flexibility in the NB-IoT system.

Figure 12:
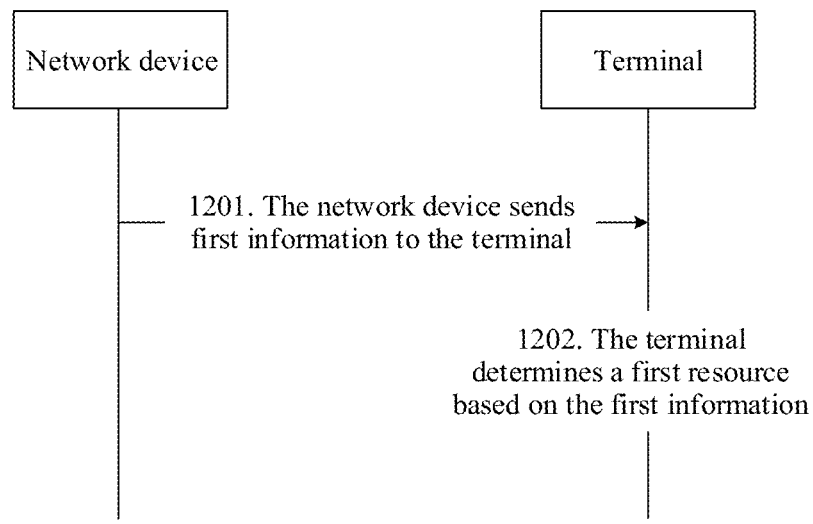
FIG. 12 is a signaling flowchart of Embodiment 2 of a resource configuration method according to the present disclosure.

FIG. 12 is a signaling flowchart of Embodiment 2 of a resource configuration method according to the present disclosure. Based on the system architecture shown in FIG. 1, as shown in FIG. 12, the method in this embodiment may include the following operations.

Operation 1201: A network device sends first information to a terminal.

The first information is used by the terminal to determine not to send data and/or receive data on a first resource. The first information includes first indication information and second indication information. The first indication information is used to indicate a frequency location of a center subcarrier in a first system, the second indication information is used to indicate a frequency location, in the first system, of a resource occupied by a second system, and the frequency location, in the first system, of the resource occupied by the second system is used to determine the first resource.

Operation 1202: The terminal determines the first resource based on the first information.

The terminal does not send data and/or receive data on the first resource.

In this embodiment, before sending the first information to the terminal, the network device first needs to determine the first resource. The terminal is an NR terminal, and the first resource is a resource reserved by the network device for an NB-IoT terminal. To be specific, the NR terminal performs rate matching near the first resource in a data transmission process, and skips sending data and/or receiving data on the first resource.

The first information sent by the network device to the terminal includes the first indication information and the second indication information. The first indication information may be used to indicate the frequency location of the center subcarrier in the first system, the second indication information is used to indicate the frequency location, in the first system, of the resource occupied by the second system, and the frequency location, in the first system, of the resource occupied by the second system is used to determine the first resource.

In one embodiment, the first system may be, for example, an LTE system, and the second system may be, for example, an NB-IoT system. The second indication information may be evolved universal terrestrial radio access (E-UTRA) cell-specific reference signal sequence information (eutra-CRS-SequenceInfo).

Specifically, when the NB-IoT system operates in an inband mode, if an NB-IoT cell identifier is the same as an LTE cell identifier, the NB-IoT system operates in an inband-samePCI mode. In this case, to enable that a cell-specific reference signal in the LTE system can be used in the NB-IoT system, the NB-IoT system may notify 5-bit eutra-CRS-SequenceInfo in broadcast information of the NB-IoT system. The information indicates a location of an RB occupied by an NB-IoT anchor carrier in the LTE system, and also indicates an offset +2.5 kHz or +7.5 kHz of the NB-IoT anchor carrier, as shown in Table 6.

TABLE 6

| E-UTRA cell-specific reference signal sequence information | Raster offset |
|---|---|
| E-UTRA physical resource block index $n'_{PRB}$ when a quantity $N_{RB}^{DL}$ of downlink resource blocks (in the LTE system) is an odd number | |
| 0 | −35 | −7.5 kHz |
| 1 | −30 | |
| 2 | −25 | |
| 3 | −20 | |
| 4 | −15 | |

TABLE 6-continued

| E-UTRA cell-specific reference signal sequence information | Raster offset | |
|---|---|---|
| 5 | −10 | |
| 6 | −5 | |
| 7 | 5 | +7.5 kHz |
| 8 | 10 | |
| 9 | 15 | |
| 10 | 20 | |
| 11 | 25 | |
| 12 | 30 | |
| 13 | 35 | |
| | E-UTRA physical resource block index $n'_{PRB}$ when a quantity $N_{RB}^{DL}$ of downlink resource blocks (in the LTE system) is an odd number | |
| 14 | −46 | +2.5 kHz |
| 15 | −41 | |
| 16 | −36 | |
| 17 | −31 | |
| 18 | −26 | |
| 19 | −21 | |
| 20 | −16 | |
| 21 | −11 | |
| 22 | −6 | |
| 23 | 5 | −2.5 kHz |
| 24 | 10 | |
| 25 | 15 | |
| 26 | 20 | |
| 27 | 25 | |
| 28 | 30 | |
| 29 | 35 | |
| 30 | 40 | |
| 31 | 45 | |

The eutra-CRS-SequenceInfo information may be used to indicate, in the inband-samePCI mode, a frequency resource of the RB occupied by the NB-IoT anchor carrier in the LTE system, equivalently indicate an offset of a frequency of a carrier center/center subcarrier in the NB-IoT system relative to a frequency of a carrier center/center subcarrier in the LTE system, and also indicate the offset +7.5 kHz or +2.5 kHz. In addition, when the NB-IoT system operates in the inband mode, an offset $v_{shift}$ of an NRS on one RB is equal to an offset $v_{shift}$ of a CRS in the LTE system, regardless of whether the NB-IoT cell ID is equal to the LTE cell ID. In the inband-samePCI mode, a quantity of NRS ports is the same as a quantity of CRS ports (1 or 2). In an inband-differentPCI mode, if a quantity of CRS ports is 1 or 2, a quantity of NRS ports is the same as a quantity of CRS ports; or if a quantity of CRS ports is 4, a quantity of NRS ports is 1 or 2.

Therefore, in one embodiment, the network device may send the first information to the terminal device. The first information includes the first indication information and the second indication information. The first indication information is used to indicate a frequency location of a center subcarrier in the LTE system, and the second indication information is the eutra-CRS-SequenceInfo information. The information may be used to determine an RB resource occupied by the NB-IoT anchor carrier, so that a subcarrier occupied by the reserved resource is determined. The terminal may determine the reserved resource based on the first indication information and the second indication information that are sent by the network device.

Further, the first information further includes third indication information. The third indication information is used to indicate at least one symbol in a first time period. The first resource is a resource determined by the terminal based on the first indication information, the second indication information, and the third indication information.

Specifically, the third indication information may be indication information indicating the reserved resource in time domain, for example, may be start symbol indication information, and the third indication information indicates a start symbol of a resource occupied by the reserved resource in one subframe or one slot. The terminal may determine, based on the third indication information, a symbol occupied by the NB-IoT system in one subframe. After receiving the first information sent by the network device, the terminal may determine the first resource based on the first indication information, the second indication information, and the third indication information that are in the first information.

The third indication information is used to indicate the at least one symbol in the first time period, so that the reserved resource can be determined. This not only can improve flexibility of deployment of an NB-IoT anchor carrier, but also can avoid a time-frequency resource waste caused due to reservation of a subcarrier-level resource, and improve resource utilization in a scenario in which an NR system and the NB-IoT system coexist.

In addition, the first information further includes fourth indication information. The fourth indication information is used to indicate a subframe or a slot occupied by the first resource. The first resource is a resource determined by the terminal based on the first indication information, the second indication information, and the fourth indication information.

Specifically, the fourth indication information may be bitmap information of a valid downlink subframe, and the fourth indication information may be used to indicate which downlink subframes are occupied by the reserved resource in a 10-millisecond period or a 40-millisecond period. In this case, the first indication information, the second indication information, and the fourth indication information may be used to indicate a symbol and a subcarrier that are occupied by the reserved resource. Correspondingly, the terminal device may determine the first resource, namely, the reserved resource, based on the first indication information, the second indication information, and the fourth indication information that are sent by the network device.

In addition, the first resource may alternatively be a resource determined by the terminal based on the first indication information, the second indication information, the third indication information, and the fourth indication information. Specifically, a subcarrier occupied by the reserved resource in frequency domain may be determined based on the first indication information, the second indication information, the third indication information, and the fourth indication information, and a subframe and a symbol in each subframe that are occupied by the reserved resource in the time domain are determined, so that a resource occupied by the reserved resource is determined. Correspondingly, the terminal device may determine the reserved resource based on the first indication information, the second indication information, the third indication information, and the fourth indication information.

Further, the first information further includes fifth indication information and sixth indication information. The fifth indication information is used to indicate the offset, on one RB, of the NRS, and the sixth indication information is used to indicate the quantity of NRS ports. The first resource is a resource determined by the terminal based on the first indication information, the second indication information, the fifth indication information, and the sixth indication information.

Specifically, the fifth indication information may be further used to indicate an offset, on one RB, of a cell-specific reference signal (CRS). In addition, the first information includes the indication information indicating the frequency location of the center subcarrier in the LTE system, the eutra-CRS-SequenceInfo, $v_{shift}$, and the quantity of NRS ports, where $v_{shift}$ is the offset, on one RB, of the NRS. Because $v_{shift}$ of the NRS is equal to $v_{shift}$ of the CRS, $v_{shift}$ may be $v_{shift}$ of the CRS, or may be $v_{shift}$ of the NRS. The quantity of NRS ports and an RE occupied by the NRS on one RB are shown in FIG. 9a and FIG. 9b. Specifically, the terminal may determine, based on the indication information indicating the frequency location of the center subcarrier in the LTE system and the eutra-CRS-SequenceInfo, an RB occupied by the reserved resource, and may determine, based on the quantity of NRS ports and $v_{shift}$, an RE occupied by the NRS on one RB and in one subframe, to determine the reserved resource.

In addition, when the first information further indicates the quantity of CRS ports, if the quantity of CRS ports is 1 or 2, the first information may not indicate the quantity of NRS ports, or if the quantity of CRS ports is 4, the first information needs to indicate the quantity of NRS ports. Therefore, if the quantity of NRS ports is not indicated, the quantity of NRS ports is equal to the quantity of CRS ports. When the quantity of CRS ports is 1 or 2, the network device does not notify the terminal of the quantity of NRS ports. This can reduce signaling overheads.

In addition, when the first information includes the first indication information, the second indication information, the fourth indication information, the fifth indication information, and the sixth indication information, the terminal may determine, based on the indication information indicating the frequency location of the center subcarrier in the LTE system, the eutra-CRS-SequenceInfo, the quantity of NRS ports, and the bitmap information of the valid downlink subframe, a resource reserved for the NRS. Specifically, the RE occupied by the NRS on one RB and in one subframe may be determined based on the indication information indicating the frequency location of the center subcarrier in the LTE system, the eutra-CRS-SequenceInfo, and the quantity of NRS ports, and a subframe in which the NRS is located may be determined based on the bitmap information of the valid downlink subframe, so that a resource occupied by the NRS is determined, and an RE occupied by the reserved resource is determined.

According to the resource configuration method provided in this embodiment of the present disclosure, the network device sends the first information to the terminal. The first information is used by the terminal to determine not to send data and/or receive data on the first resource. The first information includes the first indication information and the second indication information. The first indication information is used to indicate the frequency location of the center subcarrier in the first system, the second indication information is used to indicate the frequency location, in the first system, of the resource occupied by the second system, and the frequency location, in the first system, of the resource occupied by the second system is used to determine the first resource. The network device sends, to the terminal, the first information including the first indication information used to indicate the frequency location of the center subcarrier in the first system and the second indication information used to indicate the frequency location, in the first system, of the resource occupied by the second system. In this case, the terminal may determine the first resource based on the first indication information and the second indication information, and the terminal skips receiving and/or sending data on the determined first resource. This effectively avoids interference between the NR system and the NB-IoT system, and can improve resource configuration flexibility in the NB-IoT system.

An embodiment of the present disclosure provides a resource configuration apparatus, including a sending module.

The sending module is configured to send first information to a terminal. The first information is used by the terminal to determine not to send data and/or receive data on a first resource. The first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource.

In this embodiment, the sending module sends the first information to the terminal. The first information is used by the terminal to determine not to send data and/or receive data on the first resource. The first information includes the first indication information used to indicate the first RB and the second indication information used to indicate the subcarrier occupied by the first resource on the first RB; or the first information includes the third indication information used to indicate the first subcarrier, and the first subcarrier is used to determine the first resource. A network device sends, to the terminal, the first information including the first indication information used to indicate the first RB and the second indication information used to indicate the subcarrier occupied by the first resource on the first RB, or including the third indication information used to indicate the first subcarrier. In this case, the terminal may determine the first resource based on the first indication information and the second indication information, or determine the first resource based on the first subcarrier indicated in the third indication information, and the terminal skips receiving and/or sending data on the determined first resource. This effectively avoids interference between an NR system and an NB-IoT system, and can improve resource configuration flexibility in the NB-IoT system.

In one embodiment, the second indication information includes at least one of the following information:

a quantity of subcarriers occupied by the first resource on the first RB;

an offset between a second subcarrier of the first resource and a third subcarrier of the first RB, where the second subcarrier includes the 1$^{st}$ subcarrier of the first resource, and the third subcarrier includes the 1$^{st}$ subcarrier of the first RB; or identifier information of the subcarrier occupied by the first resource on the first RB.

In one embodiment, subcarriers occupied by the first resource further include a subcarrier occupied by the first resource on a second RB, the first RB and the second RB are contiguous RBs, the subcarrier occupied by the first resource on the first RB and the subcarrier occupied by the first resource on the second RB are contiguous subcarriers, and a sum of the quantity of subcarriers occupied by the first resource on the first RB and a quantity of subcarriers occupied by the first resource on the second RB is 12.

In one embodiment, subcarriers occupied by the first resource are N contiguous subcarriers including the first subcarrier.

In one embodiment, N is 12n or 12n+1, where n is a nonnegative integer.

In one embodiment, N is 12, 24, 36, 48, 60, 72, or 73.

In one embodiment, the third indication information is used to indicate the first subcarrier and a quantity of contiguous subcarriers occupied by the first resource, and the quantity of contiguous subcarriers occupied by the first resource is 12, 24, 36, 48, 60, 72, or 73.

In one embodiment, the first indication information is further used to indicate a third RB, and the second indication information is further used to indicate a subcarrier occupied by the first resource on the third RB. Subcarriers occupied by the first resource are contiguous subcarriers from the subcarrier occupied by the first resource on the first RB to the subcarrier occupied by the first resource on the third RB.

In one embodiment, the first information further includes fourth indication information and fifth indication information.

The fourth indication information is used to indicate a subcarrier on which a resource element RE is located, and the fifth indication information is used to indicate a symbol in which the RE is located. The first resource is an RE determined by the terminal based on the first indication information, the second indication information, the fourth indication information, and the fifth indication information; or the first resource is an RE determined by the terminal based on the third indication information, the fourth indication information, and the fifth indication information.

In one embodiment, the first information further includes sixth indication information. The sixth indication information is used to indicate at least one symbol in a first time period. The first resource is a resource determined by the terminal based on the first indication information, the second indication information, and the sixth indication information; or the first resource is a resource determined by the terminal based on the third indication information and the sixth indication information.

In one embodiment, the first information further includes seventh indication information. The seventh indication information is used to indicate at least one first time unit in a second time period, and the first time unit is a time length of the first time period.

The first resource is a resource determined by the terminal based on the first indication information, the second indication information, the sixth indication information, and the seventh indication information; or the first resource is a resource determined by the terminal based on the third indication information, the sixth indication information, and the seventh indication information; or the first resource is a resource determined by the terminal based on the first indication information, the second indication information, and the seventh indication information; or the first resource is a resource determined by the terminal based on the third indication information and the seventh indication information.

The resource configuration apparatus provided in this embodiment of the present disclosure may perform the foregoing corresponding method embodiment. Implementation principles and technical effects are similar, and details are not described herein again.

It should be noted and understood that division into the modules of the foregoing apparatus is merely logical function division. In an actual implementation, some or all modules may be integrated into one physical entity, or the modules may be physically separated. In addition, these modules may all be implemented in a form of software invoked by using a processing element, or may all be implemented in a form of hardware, or some of the modules may be implemented in a form of software invoked by using a processing element and some of the modules may be implemented in a form of hardware. For example, the sending module may be a separately disposed processing element, or may be integrated into a chip of the apparatus for implementation. In addition, the sending module may be stored in a memory of the apparatus in a form of a program and invoked by a processing element of the network device to perform a function of the sending module. Implementations of other modules are similar to the implementation of the sending module. In addition, all or some of the modules may be integrated together, or may be separately implemented. The processing element may be an integrated circuit and has a signal processing capability. In an implementation process, operations in the foregoing method or the foregoing modules can be implemented by using a hardware integrated logical circuit in the processing element, or by using an instruction in a form of software. In addition, the foregoing sending module is a sending control module, and may send information by using a sending apparatus of the network device, for example, an antenna and a radio frequency apparatus.

The foregoing modules may be configured as one or more integrated circuits for performing the foregoing method, for example, one or more application-specific integrated circuits (ASIC), one or more microprocessors (e.g., digital signal processor, DSP), or one or more field programmable gate arrays (FPGA). For another example, when one of the foregoing modules is implemented in a form of a processing element scheduling a program, the processing element may be a general purpose processor, for example, a central processing unit (CPU) or another processor that can invoke a program. For another example, the units can be integrated together and implemented in a form of a system-on-a-chip (SOC).

Figure 13:
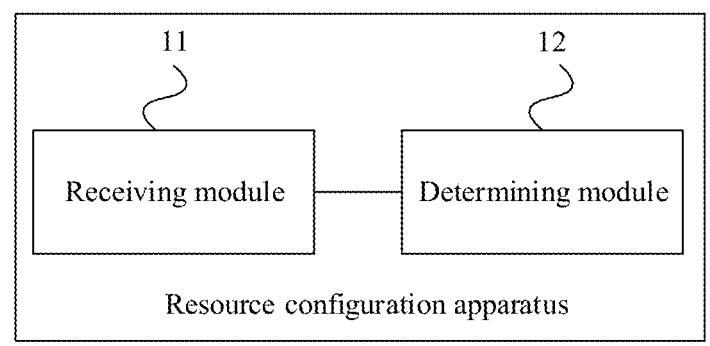
FIG. 13 is a schematic structural diagram of a resource configuration apparatus according to an embodiment of the present disclosure.

FIG. 13 is a schematic structural diagram of a resource configuration apparatus according to an embodiment of the present disclosure. As shown in FIG. 13, the apparatus includes a receiving module 11 and a determining module 12.

The receiving module 11 is configured to receive first information sent by a network device. The first information is used by a terminal to determine not to send data and/or receive data on a first resource. The first information includes first indication information used to indicate a first resource block (RB) and second indication information used to indicate a subcarrier occupied by the first resource on the first RB; or the first information includes third indication information used to indicate a first subcarrier, and the first subcarrier is used to determine the first resource.

The determining module 12 is configured to determine the first resource based on the first information.

The resource configuration apparatus provided in this embodiment of the present disclosure may perform the foregoing corresponding method embodiment. Implementation principles and technical effects are similar, and details are not described herein again.

In one embodiment, the second indication information includes at least one of the following information:

a quantity of subcarriers occupied by the first resource on the first RB;

an offset between a second subcarrier of the first resource and a third subcarrier of the first RB, where the second subcarrier includes the $1^{st}$ subcarrier of the first resource, and the third subcarrier includes the $1^{st}$ subcarrier of the first RB; or identifier information of the subcarrier occupied by the first resource on the first RB.

In one embodiment, subcarriers occupied by the first resource further include a subcarrier occupied by the first resource on a second RB, the first RB and the second RB are contiguous RBs, the subcarrier occupied by the first resource on the first RB and the subcarrier occupied by the first resource on the second RB are contiguous subcarriers, and a sum of the quantity of subcarriers occupied by the first resource on the first RB and a quantity of subcarriers occupied by the first resource on the second RB is 12.

In one embodiment, subcarriers occupied by the first resource are N contiguous subcarriers including the first subcarrier.

In one embodiment, N is 12n or 12n+1, where n is a nonnegative integer.

In one embodiment, N is 12, 24, 36, 48, 60, 72, or 73.

The third indication information is used to indicate the first subcarrier and a quantity of contiguous subcarriers occupied by the first resource, and the quantity of contiguous subcarriers occupied by the first resource is 12, 24, 36, 48, 60, 72, or 73.

In one embodiment, the first indication information is further used to indicate a third RB, and the second indication information is further used to indicate a subcarrier occupied by the first resource on the third RB. Subcarriers occupied by the first resource are contiguous subcarriers from the subcarrier occupied by the first resource on the first RB to the subcarrier occupied by the first resource on the third RB.

In one embodiment, the first information further includes fourth indication information and fifth indication information.

The fourth indication information is used to indicate a subcarrier on which a resource element RE is located, and the fifth indication information is used to indicate a symbol in which the RE is located. The first resource is an RE determined by the terminal based on the first indication information, the second indication information, the fourth indication information, and the fifth indication information; or the first resource is an RE determined by the terminal based on the third indication information, the fourth indication information, and the fifth indication information.

In one embodiment, the first information further includes sixth indication information. The sixth indication information is used to indicate at least one symbol in a first time period. The first resource is a resource determined by the terminal based on the first indication information, the second indication information, and the sixth indication information; or the first resource is a resource determined by the terminal based on the third indication information and the sixth indication information.

In one embodiment, the first information further includes seventh indication information. The seventh indication information is used to indicate at least one first time unit in a second time period, and the first time unit is a time length of the first time period.

The first resource is a resource determined by the terminal based on the first indication information, the second indication information, the sixth indication information, and the seventh indication information; or the first resource is a resource determined by the terminal based on the third indication information, the sixth indication information, and the seventh indication information; or the first resource is a resource determined by the terminal based on the first indication information, the second indication information, and the seventh indication information; or the first resource is a resource determined by the terminal based on the third indication information and the seventh indication information.

The resource configuration apparatus provided in this embodiment of the present disclosure may perform the foregoing corresponding method embodiment. Implementation principles and technical effects are similar, and details are not described herein again.

It should be noted and understood that division into the modules of the foregoing apparatus is merely logical function division. In an actual implementation, some or all modules may be integrated into one physical entity, or the modules may be physically separated. In addition, these modules may all be implemented in a form of software invoked by using a processing element, or may all be implemented in a form of hardware, or some of the modules may be implemented in a form of software invoked by using a processing element and some of the modules may be implemented in a form of hardware. For example, the receiving module may be a separately disposed processing element, or may be integrated into a chip of the apparatus for implementation. In addition, the receiving module may be stored in a memory of the apparatus in a form of a program, and invoked by a processing element of the terminal to perform a function of the receiving module. Implementations of other modules are similar to the implementation of the receiving module. In addition, all or some of the modules may be integrated together, or may be separately implemented. The processing element may be an integrated circuit and has a signal processing capability. In an implementation process, operations in the foregoing method or the foregoing modules can be implemented by using a hardware integrated logical circuit in the processing element, or by using an instruction in a form of software. In addition, the foregoing receiving module is a receiving control module, and may receive information by using a receiving apparatus of the terminal, for example, an antenna and a radio frequency apparatus.

The foregoing modules may be configured as one or more integrated circuits for performing the foregoing method, for example, one or more application-specific integrated circuits (ASIC), one or more microprocessors (e.g., digital signal processor, DSP), or one or more field programmable gate arrays (FPGA). For another example, when one of the foregoing modules is implemented in a form of a processing element scheduling a program, the processing element may be a general purpose processor, for example, a central processing unit (CPU) or another processor that can invoke a program. For another example, the units can be integrated together and implemented in a form of a system-on-a-chip (SOC).

An embodiment of the present disclosure provides a resource configuration apparatus, including a sending module.

The sending module is configured to send first information to a terminal. The first information is used by the terminal to determine not to send data and/or receive data on a first resource. The first information includes first indication information and second indication information. The first indication information is used to indicate a frequency location of a center subcarrier in a first system, the second indication information is used to indicate a frequency location, in the first system, of a resource occupied by a second system, and the frequency location, in the first system, of the resource occupied by the second system is used to determine the first resource.

The resource configuration apparatus provided in this embodiment of the present disclosure may perform the foregoing corresponding method embodiment. Implementation principles and technical effects are similar, and details are not described herein again.

In one embodiment, the first information further includes third indication information. The third indication information is used to indicate at least one symbol in a first time period. The first resource is a resource determined by the terminal based on the first indication information, the second indication information, and the third indication information.

In one embodiment, the first information further includes fourth indication information. The fourth indication information is used to indicate a subframe or a slot occupied by the first resource. The first resource is a resource determined by the terminal based on the first indication information, the second indication information, and the fourth indication information.

In one embodiment, the first information further includes fifth indication information and sixth indication information. The fifth indication information is used to indicate an offset, on one RB, of a downlink narrowband reference signal (NRS) or an offset, on one RB, of a cell-specific reference signal (CRS), and the sixth indication information is used to indicate a quantity of NRS ports. The first resource is a resource determined by the terminal based on the first indication information, the second indication information, the fifth indication information, and the sixth indication information.

The resource configuration apparatus provided in this embodiment of the present disclosure may perform the foregoing corresponding method embodiment. Implementation principles and technical effects are similar, and details are not described herein again.

It should be noted and understood that division into the modules of the foregoing apparatus is merely logical function division. In an actual implementation, some or all modules may be integrated into one physical entity, or the modules may be physically separated. In addition, these modules may all be implemented in a form of software invoked by using a processing element, or may all be implemented in a form of hardware, or some of the modules may be implemented in a form of software invoked by using a processing element and some of the modules may be implemented in a form of hardware. For example, the sending module may be a separately disposed processing element, or may be integrated into a chip of the apparatus for implementation. In addition, the sending module may be stored in a memory of the apparatus in a form of a program and invoked by a processing element of a network device to perform a function of the sending module. Implementations of other modules are similar to the implementation of the sending module. In addition, all or some of the modules may be integrated together, or may be separately implemented. The processing element may be an integrated circuit and has a signal processing capability. In an implementation process, operations in the foregoing method or the foregoing modules can be implemented by using a hardware integrated logical circuit in the processing element, or by using an instruction in a form of software. In addition, the foregoing sending module is a sending control module, and may send information by using a sending apparatus of the network device, for example, an antenna and a radio frequency apparatus.

The foregoing modules may be configured as one or more integrated circuits for performing the foregoing method, for example, one or more application-specific integrated circuits (ASIC), one or more microprocessors (e.g., digital signal processor, DSP), or one or more field programmable gate arrays (FPGA). For another example, when one of the foregoing modules is implemented in a form of a processing element scheduling a program, the processing element may be a general purpose processor, for example, a central processing unit (CPU) or another processor that can invoke a program. For another example, the units can be integrated together and implemented in a form of a system-on-a-chip (SOC).

Figure 14:
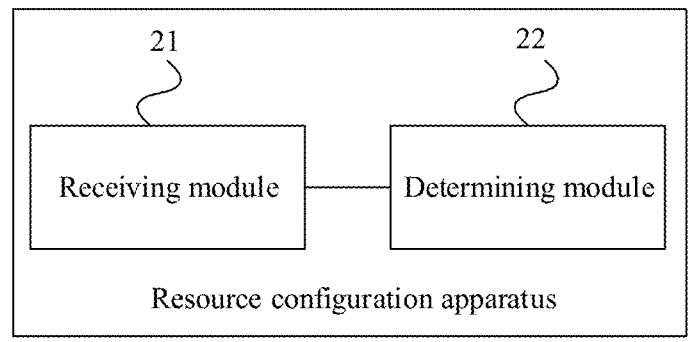
FIG. 14 is another schematic structural diagram of a resource configuration apparatus according to an embodiment of the present disclosure.

FIG. 14 is another schematic structural diagram of a resource configuration apparatus according to an embodiment of the present disclosure. As shown in FIG. 14, the apparatus includes a receiving module 21 and a determining module 22.

The receiving module 21 is configured to receive first information sent by a network device. The first information is used by the terminal to determine not to send data and/or receive data on a first resource. The first information includes first indication information and second indication information. The first indication information is used to indicate a frequency location of a center subcarrier in a first system, the second indication information is used to indicate a frequency location, in the first system, of a resource occupied by a second system, and the frequency location, in the first system, of the resource occupied by the second system is used to determine the first resource.

The determining module 22 is configured to determine the first resource based on the first information.

The resource configuration apparatus provided in this embodiment of the present disclosure may perform the foregoing corresponding method embodiment. Implementation principles and technical effects are similar, and details are not described herein again.

In one embodiment, the first information further includes third indication information. The third indication information is used to indicate at least one symbol in a first time period. The first resource is a resource determined by the terminal based on the first indication information, the second indication information, and the third indication information.

In one embodiment, the first information further includes fourth indication information. The fourth indication information is used to indicate a subframe or a slot occupied by the first resource. The first resource is a resource determined by the terminal based on the first indication information, the second indication information, and the fourth indication information.

In one embodiment, the first information further includes fifth indication information and sixth indication information. The fifth indication information is used to indicate an offset, on one RB, of a downlink narrowband reference signal (NRS) or an offset, on one RB, of a cell-specific reference signal (CRS), and the sixth indication information is used to indicate a quantity of NRS ports. The first resource is a resource determined by the terminal based on the first indication information, the second indication information, the fifth indication information, and the sixth indication information.

The resource configuration apparatus provided in this embodiment of the present disclosure may perform the foregoing corresponding method embodiment. Implementation principles and technical effects are similar, and details are not described herein again.

It should be noted and understood that division into the modules of the foregoing apparatus is merely logical function division. In an actual implementation, some or all modules may be integrated into one physical entity, or the modules may be physically separated. In addition, these modules may all be implemented in a form of software invoked by using a processing element, or may all be implemented in a form of hardware, or some of the modules may be implemented in a form of software invoked by using a processing element and some of the modules may be implemented in a form of hardware. For example, the receiving module may be a separately disposed processing element, or may be integrated into a chip of the apparatus for implementation. In addition, the receiving module may be stored in a memory of the apparatus in a form of a program, and invoked by a processing element of the terminal to perform a function of the receiving module. Implementations of other modules are similar to the implementation of the receiving module. In addition, all or some of the modules may be integrated together, or may be separately implemented. The processing element may be an integrated circuit and has a signal processing capability. In an implementation process, operations in the foregoing method or the foregoing modules can be implemented by using a hardware integrated logical circuit in the processing element, or by using an instruction in a form of software. In addition, the foregoing receiving module is a receiving control module, and may receive information by using a receiving apparatus of the terminal, for example, an antenna and a radio frequency apparatus.

The foregoing modules may be configured as one or more integrated circuits for performing the foregoing method, for example, one or more application-specific integrated circuits (ASIC), one or more microprocessors (e.g., digital signal processor, DSP), or one or more field programmable gate arrays (FPGA). For another example, when one of the foregoing modules is implemented in a form of a processing element scheduling a program, the processing element may be a general purpose processor, for example, a central processing unit (CPU) or another processor that can invoke a program. For another example, the units can be integrated together and implemented in a form of a system-on-a-chip (SOC).

Figure 15:
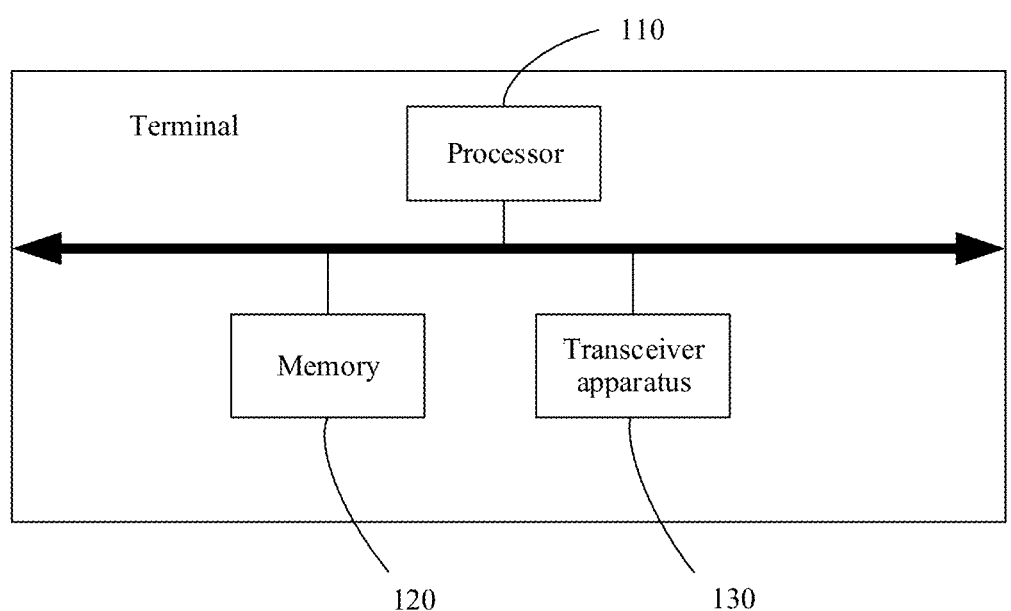
FIG. 15 is a schematic structural diagram of a terminal according to an embodiment of the present disclosure.

FIG. 15 is a schematic structural diagram of a terminal according to an embodiment of the present disclosure. As shown in FIG. 15, the terminal includes a processor 110, a memory 120, and a transceiver apparatus 130. The transceiver apparatus 130 may be connected to an antenna. In downlink, the transceiver apparatus 130 receives, by using the antenna, information sent by a base station, and sends the information to the processor 110 for processing. In uplink, the processor 110 processes data of the terminal, and sends the data to the base station by using the transceiver apparatus 130.

The memory 120 is configured to store a program for implementing the foregoing method embodiment or modules in the corresponding embodiment. The processor 110 invokes the program to perform an operation in the foregoing method embodiment, to implement the modules described in the corresponding embodiment.

Alternatively, some or all of the foregoing modules may be implemented in a form of an integrated circuit that is embedded in a chip of the terminal. In addition, the modules may be separately implemented, or may be integrated together. To be specific, the foregoing units may be configured as one or more integrated circuits for performing the foregoing method, for example, one or more application-specific integrated circuits (ASIC), one or more microprocessors (e.g., digital signal processor, DSP), or one or more field programmable gate arrays (FPGA).

Figure 16:
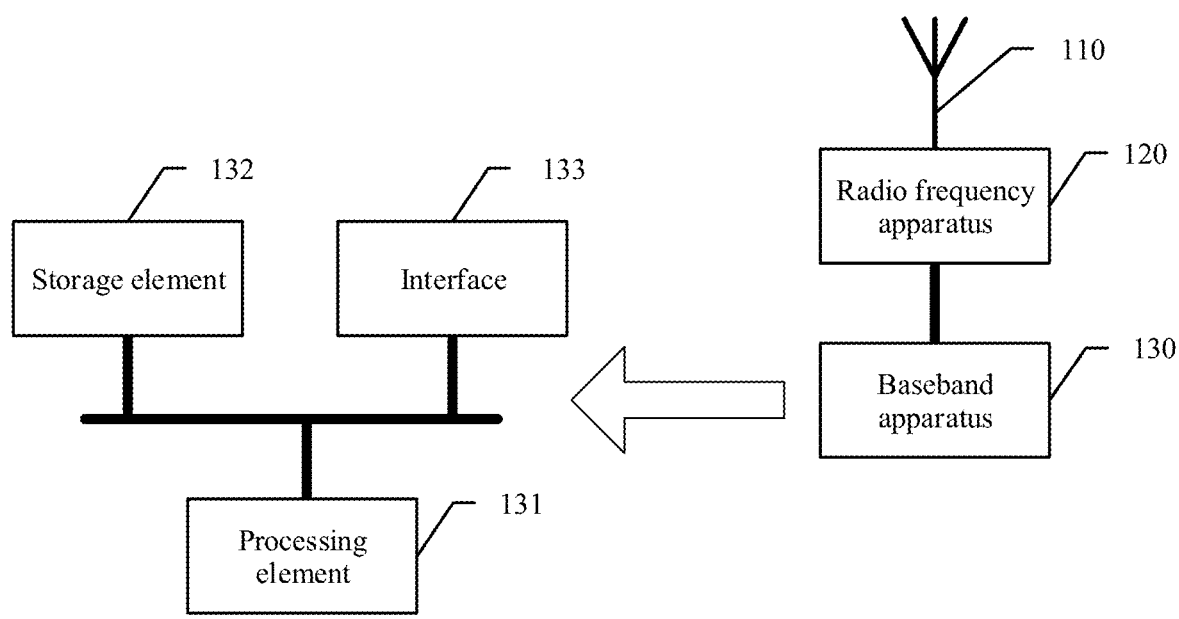
FIG. 16 is a schematic structural diagram of a network device according to an embodiment of the present disclosure.

FIG. 16 is a schematic structural diagram of a network device according to an embodiment of the present disclosure. As shown in FIG. 16, the network device includes an antenna 110, a radio frequency apparatus 120, and a baseband apparatus 130. The antenna 110 is connected to the radio frequency apparatus 120. In uplink, the radio frequency apparatus 120 receives, by using the antenna 110, information sent by a terminal, and sends the information sent by the terminal, to the baseband apparatus 130 for processing. In downlink, the baseband apparatus 130 processes the information of the terminal and sends the information to the radio frequency apparatus 120, and the radio frequency apparatus 120 processes the information of the terminal and then sends the information to the terminal by using the antenna 110.

In one embodiment, the foregoing modules are implemented by a processing element by scheduling a program. For example, the baseband apparatus 130 includes a processing element 131 and a storage element 132. The processing element 131 invokes a program stored in the storage element 132, to perform the method in the foregoing method embodiment. In addition, the baseband apparatus 130 may further include an interface 133, configured to exchange information with the radio frequency apparatus 120. For example, the interface is a common public radio interface (CPRI).

In another embodiment, the foregoing modules may be configured as one or more processing elements for implementing the foregoing method, and the processing elements are disposed on the baseband apparatus 130. The processing element herein may be an integrated circuit, for example, one or more ASICs, one or more DSPs, or one or more FPGAs. These integrated circuits may be integrated together to form a chip.

For example, the foregoing modules may be integrated together and implemented in a form of a system-on-a-chip (SOC). For example, the baseband apparatus 130 includes an SOC chip, configured to implement the foregoing method. The processing element 131 and the storage element 132 may be integrated in the chip, and the processing element 131 may implement the foregoing method or the functions of the foregoing units in a form of invoking the program stored in the storage element 132. Alternatively, at least one integrated circuit may be integrated in the chip to implement the foregoing method or the functions of the foregoing units. Alternatively, the foregoing implementations may be combined, so that functions of some units are implemented by the processing element in a form of invoking the program, and functions of some units are implemented by using an integrated circuit.

Regardless of a manner, the network device includes at least one processing element, storage element, and communications interface, and the at least one processing element is configured to perform the method provided in the foregoing method embodiment. The processing element may perform some or all of the operations in the foregoing method embodiment in a first manner, in other words, by executing the program stored in the storage element, or in a second manner, in other words, by using an integrated logic circuit of hardware in the processor element in combination with an instruction. Certainly, the method provided in the foregoing method embodiment may be alternatively performed by combining the first manner and the second manner.

As described above, the processing element herein may be a general purpose processor, for example, a central processing unit (CPU), or may be configured as one or more integrated circuits for performing the foregoing method, for example, one or more application-specific integrated circuits (ASIC), one or more microprocessors (e.g., digital signal processor, DSP), or one or more field programmable gate arrays (FPGA).

The storage element may be a memory, or a general name of a plurality of storage elements.

The present disclosure further provides a storage medium, including a readable storage medium and a computer program. The computer program is used to implement the resource configuration method provided in any one of the foregoing embodiments.

The present disclosure further provides a program product. The program product includes a computer program (that is, an executable instruction), and the computer program is stored in a readable storage medium. At least one processor of a network device may read the computer program from the readable storage medium, and the at least one processor executes the computer program, so that the network device implements the resource configuration method provided in each of the foregoing embodiments.

An embodiment of the present disclosure further provides a resource configuration apparatus, including at least one storage element and at least one processing element. The at least one storage element is configured to store a program. When the program is executed, the resource configuration apparatus is enabled to perform an operation of a network device in any one of the foregoing embodiments. The apparatus may be a network device chip.

The present disclosure further provides a storage medium, including a readable storage medium and a computer program. The computer program is used to implement the resource configuration method provided in any one of the foregoing embodiments.

The present disclosure further provides a program product. The program product includes a computer program (that is, an executable instruction), and the computer program is stored in a readable storage medium. At least one processor of the terminal may read the computer program from the readable storage medium, and the at least one processor executes the computer program, so that a terminal implements the resource configuration method provided in each of the foregoing embodiments.

An embodiment of the present disclosure further provides a resource configuration apparatus, including at least one storage element and at least one processing element. The at least one storage element is configured to store a program. When the program is executed, the resource configuration apparatus is enabled to perform an operation of a terminal in any one of the foregoing embodiments. The apparatus may be a terminal chip.

All or some of the operations of the foregoing method embodiments may be implemented by using a program by instructing related hardware. The foregoing program may be stored in a computer-readable memory. When the program is executed, the operations of the methods in the embodiments are performed. The memory (storage medium) includes: a read-only memory (ROM), a RAM, a flash memory, a hard disk, a solid-state drive, a magnetic tape, a floppy disk, an optical disc, and any combination thereof.

What is claimed is:

1. A resource configuration method, comprising:
sending, by a network device, first information to a terminal, wherein the first information is used by the terminal to determine not to send data and/or receive data on a first resource,
wherein the first information comprises first indication information and second indication information, the first indication information comprises first indices of at least two contiguous resource blocks (RBs), the first indices used to indicate a frequency location of a center subcarrier in a first system, and the second indication information comprises a second index indicating a number of subcarriers of one of the at least two contiguous resource blocks occupied by the first resource, the second index used to indicate a frequency location, in the first system, of a resource occupied by a second system,
wherein the frequency location, in the first system, of the resource occupied by the second system is used to determine the first resource, and
wherein the first information further comprises fifth indication information and sixth indication information, the fifth indication information is used to indicate an offset, on one RB of the at least two contiguous RBs, of a downlink narrowband reference signal (NRS) or an offset, on one RB of the at least two contiguous RBs, of a cell-specific reference signal (CRS), and the sixth indication information is used to indicate a quantity of NRS ports; and the first resource is a resource determined by the terminal based on the first indication information, the second indication information, the fifth indication information, and the sixth indication information.

2. The method according to claim 1, wherein the first information further comprises fourth indication information, and the fourth indication information is used to indicate a subframe or a slot occupied by the first resource; and the first resource is a resource determined by the terminal based on the first indication information, the second indication information, the fourth indication information, the fifth indication information, and the sixth indication information.

3. The method according to claim 1, wherein a sum of a quantity of subcarriers occupied by the first resource on the at least two contiguous RBs is twelve.

4. A resource configuration method, comprising:
receiving, by a terminal, first information sent by a network device, wherein the first information is used by the terminal to determine not to send data and/or receive data on a first resource,
wherein the first information comprises first indication information and second indication information, the first indication information comprises first indices of at least two contiguous resource blocks (RBs), the first indices used to indicate a frequency location of a center subcarrier in a first system, and the second indication information comprises a second index indicating a number of subcarriers of one of the at least two contiguous resource blocks occupied by the first resource, the second index used to indicate a frequency location, in the first system, of a resource occupied by a second system, and
wherein the frequency location, in the first system, of the resource occupied by the second system is used to determine the first resource; and
determining, by the terminal, the first resource based on the first information, wherein the first information further comprises fifth indication information and sixth indication information, the fifth indication information is used to indicate an offset, on one RB of the at least two contiguous RBs, of a downlink narrowband reference signal (NRS) or an offset, on one RB of the at least two contiguous RBs, of a cell-specific reference signal (CRS), and the sixth indication information is used to indicate a quantity of NRS ports; and the first resource is a resource determined by the terminal based on the first indication information, the second indication information, the fifth indication information, and the sixth indication information.

5. The method according to claim 4, wherein the first information further comprises fourth indication information, and the fourth indication information is used to indicate a subframe or a slot occupied by the first resource; and the first resource is a resource determined by the terminal based on the first indication information, the second indication information, the fourth indication information, the fifth indication information, and the sixth indication information.

6. The method according to claim 4, wherein a sum of a quantity of subcarriers occupied by the first resource on the at least two contiguous RBs is twelve.

7. A resource configuration apparatus, comprising:
a transmitter, configured to send first information to a terminal, wherein the first information is used by the terminal to determine not to send data and/or receive data on a first resource,
wherein the first information comprises first indication information and second indication information, the first indication information comprises first indices of at least two contiguous resource blocks (RBs), the first indices used to indicate a frequency location of a center subcarrier in a first system, and the second indication information comprises a second index indicating a number of subcarriers of one of the at least two contiguous resource blocks occupied by the first resource, the second index used to indicate a frequency location, in the first system, of a resource occupied by a second system,
wherein the frequency location, in the first system, of the resource occupied by the second system is used to determine the first resource, and
wherein the first information further comprises fifth indication information and sixth indication information, the fifth indication information is used to indicate an offset, on one RB of the at least two contiguous RBs, of a downlink narrowband reference signal (NRS) or an offset, on one RB of the at least two contiguous RBs, of a cell-specific reference signal (CRS), and the sixth indication information is used to indicate a quantity of NRS ports; and the first resource is a resource determined by the terminal based on the first indication information, the second indication information, the fifth indication information, and the sixth indication information.

8. The apparatus according to claim 7, wherein the first information further comprises fourth indication information, and the fourth indication information is used to indicate a subframe or a slot occupied by the first resource; and the first resource is a resource determined by the terminal based on the first indication information, the second indication information, the fourth indication information, the fifth indication information, and the sixth indication information.

9. The apparatus according to claim 7, wherein a sum of a quantity of subcarriers occupied by the first resource on the at least two contiguous RBs is twelve.

10. A resource configuration apparatus, comprising:
a receiver, configured to receive first information sent by a network device, wherein the first information is used by a terminal to determine not to send data and/or receive data on a first resource,
wherein the first information comprises first indication information and second indication information, the first indication information comprises first indices of at least two contiguous resource blocks (RBs), the first indices used to indicate a frequency location of a center subcarrier in a first system, and the second indication information comprises a second index indicating a number of subcarriers of one of the at least two contiguous resource blocks occupied by the first resource, the second index used to indicate a frequency location, in the first system, of a resource occupied by a second system, and
wherein the frequency location, in the first system, of the resource occupied by the second system is used to determine the first resource; and
a processor, configured to determine the first resource based on the first information,
wherein the first information further comprises fifth indication information and sixth indication information, the fifth indication information is used to indicate an offset, on one RB of the at least two contiguous RBs, of a downlink narrowband reference signal (NRS) or an offset, on one RB of the at least two contiguous RBs, of a cell-specific reference signal (CRS), and the sixth indication information is used to indicate a quantity of NRS ports; and the first resource is a resource determined by the terminal based on the first indication information, the second indication information, the fifth indication information, and the sixth indication information.

11. The apparatus according to claim 10, wherein the first information further comprises fourth indication information, and the fourth indication information is used to indicate a subframe or a slot occupied by the first resource; and the first resource is a resource determined by the terminal based on the first indication information, the second indication information, the fourth indication information, the fifth indication information, and the sixth indication information.

12. The apparatus according to claim 10, wherein a sum of a quantity of subcarriers occupied by the first resource on the at least two contiguous RBs is twelve.

13. A non-transitory computer-readable medium having processor-executable instructions stored thereon, the processor-executable instructions, when executed, facilitate performance of a communication method comprising:
sending first information to a terminal, wherein the first information is used by the terminal to determine not to send data and/or receive data on a first resource,
wherein the first information comprises first indication information and second indication information, the first indication information comprises first indices of at least two contiguous resource blocks (RBs), the first indices used to indicate a frequency location of a center subcarrier in a first system, and the second indication information comprises a second index indicating a number of subcarriers of one of the at least two contiguous resource blocks occupied by the first resource, the second index used to indicate a frequency location, in the first system, of a resource occupied by a second system, wherein the frequency location, in the first system, of the resource occupied by the second system is used to determine the first resource, and wherein the first information further comprises fifth indication information and sixth indication information, the fifth indication information is used to indicate an offset, on one RB of the at least two contiguous RBs, of a downlink narrowband reference signal (NRS) or an offset, on one RB of the at least two contiguous RBs, of a cell-specific reference signal (CRS), and the sixth indication information is used to indicate a quantity of NRS ports; and the first resource is a resource determined by the terminal based on the first indication information, the second indication information, the fifth indication information, and the sixth indication information.

14. The non-transitory computer-readable medium according to claim 13, wherein the first information further comprises fourth indication information, and the fourth indication information is used to indicate a subframe or a slot occupied by the first resource; and the first resource is a resource determined by the terminal based on the first indication information, the second indication information, the fourth indication information, the fifth indication information, and the sixth indication information.

15. The non-transitory computer-readable medium according to claim 13, wherein a sum of a quantity of sub carriers occupied by the first resource on the at least two contiguous RBs is twelve.

16. A non-transitory computer-readable medium having processor-executable instructions stored thereon, the processor-executable instructions, when executed, facilitate performance of a communication method comprising:

receiving first information sent by a network device, wherein the first information is used by a terminal to determine not to send data and/or receive data on a first resource, wherein the first information comprises first indication information and second indication information, the first indication information comprises first indices of at least two contiguous resource blocks (RBs), the first indices used to indicate a frequency location of a center subcarrier in a first system, and the second indication information comprises a second index indicating a number of subcarriers of one of the at least two contiguous resource blocks occupied by the first resource, the second index used to indicate a frequency location, in the first system, of a resource occupied by a second system, and wherein the frequency location, in the first system, of the resource occupied by the second system is used to determine the first resource; and determining the first resource based on the first information, wherein the first information further comprises fifth indication information and sixth indication information, the fifth indication information is used to indicate an offset, on one RB of the at least two contiguous RBs, of a downlink narrowband reference signal (NRS) or an offset, on one RB of the at least two contiguous RBs, of a cell-specific reference signal (CRS), and the sixth indication information is used to indicate a quantity of NRS ports; and the first resource is a resource determined by the terminal based on the first indication information, the second indication information, the fifth indication information, and the sixth indication information.

17. The non-transitory computer-readable medium according to claim 16, wherein the first information further comprises fourth indication information, and the fourth indication information is used to indicate a subframe or a slot occupied by the first resource; and the first resource is a resource determined by the terminal based on the first indication information, the second indication information, the fourth indication information, the fifth indication information, and the sixth indication information.

18. The non-transitory computer-readable medium according to claim 16, wherein a sum of a quantity of sub carriers occupied by the first resource on the at least two contiguous RBs is twelve.

* * * * *